United States Patent [19]

Chang et al.

[11] Patent Number: 4,684,697
[45] Date of Patent: Aug. 4, 1987

[54] COMPOSITIONS BASED ON SILANE HYDROLYZATES AND VINYL POLYMERS CONTAINING HYDROLYZABLE SILYL GROUPS

[75] Inventors: Wen-Hsuan Chang, Gibsonia; William P. Blackburn, Evans City; Paul J. Prucnal, Pittsburgh; Edward L. Dufford, Sarver, all of Pa.

[73] Assignee: PPG Industries, Inc., Pittsburgh, Pa.

[21] Appl. No.: 881,434

[22] Filed: Jul. 2, 1986

Related U.S. Application Data

[63] Continuation-in-part of Ser. No. 728,968, Apr. 30, 1985, Pat. No. 4,604,443, and Ser. No. 728,973, Apr. 30, 1985.

[51] Int. Cl.$^4$ .............................................. C08F 8/00
[52] U.S. Cl. .................... 525/100; 525/61; 525/104; 525/403; 525/431; 525/446; 528/18; 528/26; 528/27; 528/28; 528/29; 528/38; 528/43; 528/10
[58] Field of Search ............. 528/28, 26, 29, 27, 528/18, 10, 38, 43; 525/446, 403, 431, 61, 100, 104

[56] References Cited

U.S. PATENT DOCUMENTS

| 3,451,838 | 6/1969 | Burzynski et al. . |
|---|---|---|
| 3,460,980 | 8/1969 | Burzynski . |
| 3,634,321 | 1/1972 | Nugent et al. . |
| 3,642,693 | 2/1972 | Jasinski . |
| 3,792,071 | 2/1974 | Nitzsche et al. . |
| 4,191,713 | 4/1980 | Yonezawa et al. . |
| 4,242,252 | 12/1980 | Newing . |
| 4,243,767 | 1/1981 | Kaufman et al. . |
| 4,368,294 | 1/1983 | Deubzer et al. . |
| 4,378,250 | 4/1983 | Treadway et al. . |
| 4,399,261 | 8/1983 | Kato et al. . |
| 4,444,973 | 4/1984 | Schonfelder et al. . |
| 4,446,292 | 5/1984 | Chang et al. . |
| 4,467,081 | 8/1984 | Chang et al. . |
| 4,472,465 | 9/1984 | Burrill . |
| 4,501,872 | 2/1985 | Chang et al. . |
| 4,604,443 | 8/1986 | Chang et al. ...................... 528/28 |

FOREIGN PATENT DOCUMENTS 126470 7/1984 Japan .
2063281A 6/1981 United Kingdom .

Primary Examiner—Melvyn I. Marquis
Attorney, Agent, or Firm—Thomas M. Breininger

[57] ABSTRACT

Disclosed are moisture-curable compositions based on (A) ungelled, partial hydrolyzates or organosilicon-containing materials in combination with (B) acrylic addition interpolymers containing hydrolyzable silyl groups.

The organosilicon-containing material for preparation of the ungelled partial hydrolysis product has an average functionality based on easily hydrolyzable Y groups attached to silicon atoms of greater than or equal to 2.4 and contains greater than or equal to 10 mole percent of at least one organosilane compound corresponding to the formula R-Si-Y$_3$. The partial hydrolysis product is prepared using a controlled amount of water.

The acrylic addition interpolymer is not particularly limited provided that it contains at least one silicon atom directly bonded to a hydrolyzable group and is compatible with the ungelled partial hydrolysis product.

26 Claims, No Drawings

COMPOSITIONS BASED ON SILANE HYDROLYZATES AND VINYL POLYMERS CONTAINING HYDROLYZABLE SILYL GROUPS

This application is a continuation-in-part of copending applications Ser. No. 728,968 filed Apr. 30, 1985 entitled, "Partial Hydrolyzates Containing Hydrolyzable Moieties From Organosilane Compounds," now U.S. Pat. No. 4,604,443 and Ser. No. 728,973 filed Apr. 30, 1985 entitled, "Acrylic Polymers Containing Hydrolyzable Moieties From Organosilane Compounds."

BACKGROUND OF THE INVENTION

The present invention is directed to curable compositions, especially coating compositions, based on partial hydrolyzates of organosilane compounds in combination with acrylic resins containing hydrolyzable silyl groups.

There is a continuing need, particularly in the coatings industry, to provide compositions which have low curing temperatures and, preferably, which cure at ambient temperature. There is also a continuing need to provide compositions which contain ever lower concentrations of volatile organic components. Additionally, it would be desirable to provide compositions which do not depend on organic isocyanates for curing. Also it would be desirable if such compositions could be cured to provide films having excellent appearance properties as required, for example, for automotive applications.

However, previous approaches to meet these challenges generally have involved disadvantageous compromises among desirable coating composition properties such as molecular weight of the principal film forming resin, application viscosity of the composition, low curing temperature, and desirable properties of the cured film such as water resistance, flexibility, hardness, solvent resistance, etc.

Objects of the present invention are to help meet these challenges. Other objects of the invention will become apparent to the reader infra.

SUMMARY OF THE INVENTION

The present invention is for a moisture-curable composition comprising: (A) an ungelled partial hydrolysis product of an organosilicon-containing material, and (B) an acrylic addition interpolymer containing at least one silicon atom directly bonded to a hydrolyzable group.

The organosilicon-containing material for preparation of the ungelled partial hydrolysis product has an average functionality based on easily hydrolyzable Y groups attached to silicon atoms of greater than or equal to 2.4. The organosilicon-containing material for preparation of the ungelled partial hydrolysis product contains greater than or equal to 10 mole percent of at least one organosilane compound corresponding to the formula (I) R—Si—Y$_3$, and typically contains greater than or equal to 30 mole percent of the organosilane compound corresponding to the formula R—S—Y$_3$. In the aforesaid formula, R represents hydrogen or a C$_1$-C$_{10}$ group joined to Si through an Si—C linkage. Each Y, which may be the same or different, in the aforesaid formula independently represents an easily hydrolyzable group. The partial hydrolysis product is prepared by hydrolyzing a portion of the easily hydrolyzable groups of the organosilane compound with a controlled amount of water. The amount of water employed in the controlled hydrolysis is determined according to the following formula (II), $(E_{1,2} \times 0.5) + (E_{3,4} \times Z) = W$, wherein W represents the total moles of H$_2$O employed calculated based on the total equivalents of the easily hydrolyzable groups employed, E$_{1,2}$ represents the total number of equivalents of Y employed from organosilane compounds containing one or two Y groups, E$_{3,4}$ represents the total number of equivalents of Y employed from organosilane compounds containing three or four Y groups, and Z is a number in the range of from 0.023 to 0.43.

The acrylic addition interpolymer is not particularly limited provided that it contains at least one silicon atom directly bonded to a hydrolyzable group and is compatible with the aforesaid ungelled partial hydrolysis product.

DETAILED DESCRIPTION OF THE INVENTION

A composition of the present invention requires an ungelled partial hydrolysis product of an organosilicon-containing material which product is prepared utilizing a controlled amount of water. The partial hydrolysis product is ungelled. As used herein "ungelled" means that the partial hydrolysis product is fluid per se or can be made fluid with organic solvent. The organosilicon-containing material for preparation of the ungelled partial hydrolysis product contains at least one organosilane compound corresponding to the formula R—Si—Y$_3$, and contains greater than or equal to 10 mole percent, preferably greater than or equal to 30 mole percent, and more preferably greater than or equal to 60 mole percent, of the organosilane compound corresponding to the formula R—Si—Y$_3$ based on the total moles of organosilane compounds containing easily hydrolyzable groups in the organosilicon-containing material. The organosilicon-containing material for preparation of the ungelled partial hydrolysis product has an average functionality based on easily hydrolyzable Y groups attached to silicon atoms of the organosilane compounds present (but excluding organosilane compounds which may be present having only 1 easily hydrolyzable group Y) of equal to or greater than 2.4, preferably equal to or greater than 2.6, and most preferably equal to or greater than 2.8. It is desirable to have a high degree of hydrolyzable Y group functionality in the partial hydrolysis product to enhance the reactivity of the partial hydrolysis product with the coreactive acrylic addition interpolymer as well as with other coreactive materials which may be present such as, for example, hydroxyl-functional (i.e., C—OH) materials like organic polyols. Additionally, it is desirable that the amount of phenyl groups attached to silicon atoms in the ungelled partial hydrolysis products be minimized since the presence of such groups tends to decrease the reactivity of the partial hydrolysis products with the aforesaid coreactive materials.

In the aforesaid formula (I), R represents hydrogen; or a C$_1$-C$_{10}$ group joined to Si through an Si—C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, a vinyl group, an allyl group, and/or a halo group. In the aforesaid definition of R, it is to be understood that the $C_1$-$C_{10}$ group joined to Si through an Si—C linkage can be saturated or can contain aromatic and/or ethylenic unsaturation; however it is preferred that R be an aliphatic group. It is also preferred that R be selected from hydrogen or a $C_1$-$C_5$ group, more preferably from hydrogen or a $C_1$-$C_3$ group. It is most preferred that R be a methyl group.

Each Y, which may be the same or different in the aforesaid formula (I), represents an easily hydrolyzable group. The partial hydrolysis product is prepared by hydrolyzing a portion of the easily hydrolyzable groups of the organosilane compound(s) with a controlled amount of water. The amount of water employed in the controlled hydrolysis is determined according to the following formula (II), $$(E_{1,2} \times 0.5) + (E_{3,4} \times Z) = W,$$

wherein

W represents the total moles of $H_2O$ employed calculated based on the total equivalents of the easily hydrolyzable groups employed, $E_{1,2}$ represents the total number of equivalents of Y employed from organosilane compounds containing one or two Y groups, $E_{3,4}$ represents the total number of equivalents of Y employed from organosilane compounds containing three or four Y groups, and Z is a number in the range of from 0.023 to 0.43, preferably in the range of from 0.050 to 0.33, and more preferably in the range of from 0.080 to 0.23.

It is to be understood that one equivalent of the easily hydrolyzable groups corresponds to one mole of the easily hydrolyzable groups, and one equivalent of water corresponds to ½ mole of water.

Examples of groups which can represent the hydrolyzable group Y include —OR$^1$,

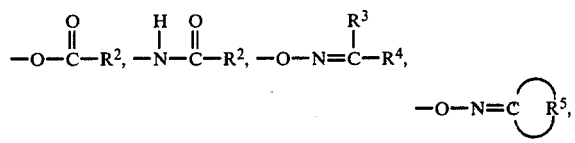

and the monohydroxy and/or cyclic $C_2$-$C_3$ residue of a 1,2- or 1,3-glycol, wherein R$^1$ represents $C_1$-$C_3$ alkyl, preferably $C_1$-$C_2$ alkyl, and more preferably methyl, R$_2$ independently represents H or $C_1$-$C_4$ alkyl, R$^3$ and R$^4$ independently represent H, $C_1$-$C_4$ alkyl, or $C_6$-$C_8$ aryl and R$^5$ represents $C_4$-$C_7$ alkylene.

Methoxy, ethoxy and acetoxy are particularly preferred hydrolyzable groups, Y.

Of the above examples of hydrolyzable groups Y, the groups

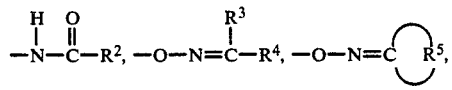

and the monohydroxy and/or cyclic $C_2$-$C_3$ residue of a 1,2- or 1,3-glycol as defined above, are less preferred than the hydrolyzable group —OR$^1$ as defined above, the groups

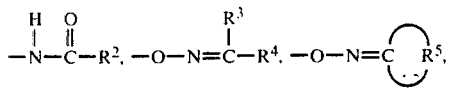

being much less preferred since they can contribute to higher weight loss than desired for some applications when compositions of the invention containing these groups, are cured; and their products upon cure tend to have lower vapor pressures than desired for some applications which may increase the curing times and/or temperatures of compositions of the invention. Thus, these groups are less preferable than the aforesaid —OR$^1$ groups, particularly methoxy and ethoxy, where short curing times, low weight loss and low curing temperatures are an important consideration.

Examples of organosilanes corresponding to the formula (I), R—Si—Y$_3$, which may be employed for preparation of suitable ungelled partial hydrolysis products include: methyl trimethoxy silane, methyl triethoxy silane, amyl triethoxy silane, triethoxy silane, methyl triacetoxy silane, phenyl trimethoxy silane, vinyl trimethoxy silane, vinyl triethoxy silane, allyl trimethoxy silane, allyl triethoxy silane, gamma-aminopropyl trimethoxy silane, gamma-aminopropyl triethoxy silane, beta-aminoethyl trimethoxy silane, beta-aminoethyl triethoxy silane, N-beta-aminoethylaminopropyl trimethoxy silane, gamma-isocyanatopropyl triethoxy silane, mercaptopropyl trimethoxy silane, mercaptoethyl trimethoxy silane, mercaptopropyl triethoxy silane, glycidoxypropyl trimethoxy silane, glycidoxypropyl triethoxy silane, 4,5-epoxycyclohexylethyl trimethoxy silane, ureidopropyl trimethoxy silane, ureidopropyl triethoxy silane, chloropropyl trimethoxy silane, chloropropyl triethoxy silane,

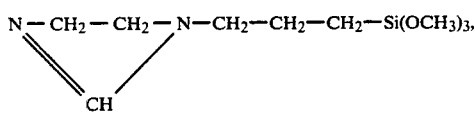

cyanopropyl trimethoxy silane and the like. Of the aforesaid examples of organosilanes corresponding to the formula (I), particularly preferred are methyl trimethoxy silane, methyl triethoxy silane, and methyl triacetoxy silane. Of course, it will be understood that mixtures of organosilanes corresponding to the formula (I) can be employed to prepare the ungelled partial hydrolysis products.

Additionally, organosilanes other than the organosilanes corresponding to formula (I) can be used along with those corresponding to formula (I) in the organosilicon-containing material for preparation of the ungelled partial hydrolysis product. For example, the organosilicon-containing material for preparation of the ungelled partial hydrolysis product may contain methyl trimethoxy silane, methyl phenyl dimethoxy silane and phenyl trimethoxy silane. However, when such a mixture of organosilanes is employed, the organosilicon-containing material contains greater than or equal to 10 mole percent, preferably greater than or equal to 30 mole percent, more preferably greater than or equal to 60 mole percent, of at least one organosilane compound corresponding to formula (I), namely R—Si—Y$_3$. It has been found that often such partial hydrolysis products of methyl trimethoxy silane, methyl phenyl dimethoxy silane, and phenyl trimethoxy silane are more compatible with organic polymers such as, for example, hydroxyl-functional acrylic resins than the partial hydrolysis product of methyl trimethoxy silane alone.

Classes of such organosilanes not necessarily corresponding to formula (I) which can be used, along with a compound corresponding to formula (I) above, in the organosilicon-containing materials for preparation of the ungelled partial hydrolysis products include, but are not limited to, the following classes (1) through (4).

(1) Suitable organosilicon-containing materials include optional organosilicates such as organosilicates corresponding to the following formula, (IV),

(IV)

wherein $R^6$ represents methyl, ethyl or propyl (thus $OR^6$ is a "lower alkoxy moiety), $R^7$ represents alkyl containing at least 4 carbon atoms, aryl, alkylaryl, arylalkyl, aryloxyalkyl, or alkyloxyalkyl, and x is an integer ranging from 0 to 2, preferably 0 or 1, and more preferably 0.

Examples of useful organosilicates include: tetramethoxy silane, tetraethoxy silane, tetra-n-propoxy silane, methoxy triethoxy silane, dimethoxy diethoxy silane, trimethoxy-n-propoxy silane, bis(2-ethylhexoxy)diethoxy silane and the like. Mixtures of organosilicates also may be employed.

Of the organosilicates corresponding to the formula (IV), above, the tetraalkoxy silanes wherein x equals 0 in formula (IV) are preferred. The tetraalkoxy silanes provide a high degree of functionality to the partial hydrolysis products and enhance the ease with which the compositions of the invention can be cured. Additionally, the tetraalkoxy silanes are readily available at low cost. Furthermore, they can be used to attach modifying groups such as those represented by $—OR^7$ in formula (IV) above, an example of which is a sec-butoxy group; and such modification is preferred in many uses. Of the examples of organosilicates described above, tetramethoxy silane is desirable for some purposes because of the ease with which it reacts. Tetraethoxy silane is also desirable since, although tetraethoxy silane is not as reactive as tetramethoxy silane, it is not as highly volatile as tetramethoxy silane.

Examples of organosilicates, other than the above organosilicates, which may be utilized in preparing the ungelled partial hydrolysis product include tetraacetoxy silane, diethoxy diacetoxy silane, and

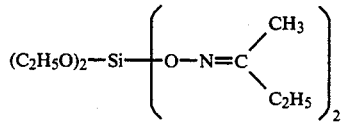

Hydrolyzed organosilicates can provide increased reactive groups per molecule in the ungelled partial hydrolysis products. Additionally, the hydrolyzed organosilicates can help provide low volatility to the ungelled partial hydrolysis products. Also they can help to provide compatibility with many organic materials.

In preparing a partial hydrolysis product, for example, when an optional organosilicate of formula (IV) above is employed along with organosilane compound corresponding to $R—Si—Y_3$ as defined above, a controlled amount of water is employed. Typically the hydrolysis product will be prepared utilizing a ratio of moles of the organosilicate to moles of water ranging from 1:0.75 to 1:0.4. The amount of unhydrolyzed organosilicate compound in the partial hydrolysis product typically is less than 50 percent by weight of the organosilicate compound based on the total weight of starting organosilicate compound.

Where desired, organosilicates containing higher alkoxy, aryloxy, arylalkyloxy, alkylaryloxy, alkyloxyalkyloxy, and/or aryloxyalkyloxy moieties attached to silicon atoms in addition to the hydrolyzable moieties may be employed for preparation of the ungelled partial hydrolysis products. The term "higher alkoxy" is intended to mean an alkoxy group having at least 4 carbon atoms such as sec-butoxy, n-pentoxy, isopentoxy, neopentoxy, hexoxy, nonoxy, isodecyloxy and the like. Examples of aryloxy, arylalkyloxy, alkylaryloxy, alkyloxyalkyloxy and/or aryloxyalkyloxy moieties include phenoxy, benzyloxy, phenylethoxy, tolyloxy, xylyloxy, 4-ethylphenoxy, phenoxyethoxy, 2-butoxyethoxy and the like. It is believed that the presence of such higher alkoxy, aryloxy, arylalkyloxy, alkylaryloxy, alkyloxyalkyloxy and/or aryloxyalkyloxy moieties from the organosilicon-containing material provides enhanced hydrolytic stability to the ungelled partial hydrolysis products and enhanced hydrolytic stability to cured films prepared from compositions of the invention. Also such moieties can be employed to control the degree of crosslinking in films prepared from compositions of the invention.

(2) Suitable organosilicon-containing materials include nonfunctional organosilanes. As used herein, a nonfunctional organosilane is understood to mean a material corresponding to the formula, (VI),

(VI)

wherein $R^8$ represents hydrogen, alkyl, aryl, alkylaryl, arylalkyl, or aryloxyalkyl, preferably $C_1$–$C_3$ alkyl, and most preferably methyl;

Y represents $—OR^1$,

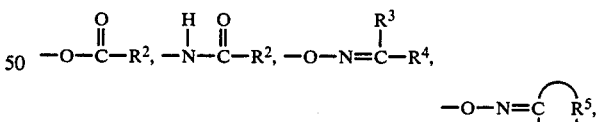

and the monohydroxy and/or cyclic $C_2$–$C_3$ residue of a 1,2- or 1,3-glycol, wherein $R^1$ represents $C_1$–$C_3$ alkyl, preferably $C_1$–$C_2$ alkyl, and more preferably methyl, $R^2$ independently represents H or $C_1$–$C_4$ alkyl, $R^3$ and $R^4$ independently represent H, $C_1$–$C_4$ alkyl, $C_6$–$C_8$ aryl and $R^5$ represents $C_4$–$C_7$ alkylene, and m is an integer ranging from 1 to 2, preferably 1.

It should be understood that the term "nonfunctional organosilane" wherever appearing herein is used for convenience to distinguish compounds corresponding to the above formula, (VI) from those compounds referred to herein for convenience as functional organosilanes and corresponding to the formula VII infra. Thus, although moieties defined by Y in formula (VI) are easily displaceable by reaction with water and/or alcohol and are therefore necessarily rather reactive, they are not defined herein as "functional" as this word is used in connection with the definition of a "functional organosilane" infra.

Partial hydrolysis products of nonfunctional organosilanes can be prepared in a manner similar to the preparation of partial hydrolysis products of organosilicates discussed above. In the preparation of a partial hydrolysis product of a nonfunctional organosilane a controlled amount of water is employed. Typically the hydrolysis product will be prepared utilizing a ratio of moles of the nonfunctional organosilane to moles of water ranging from 1:0.75 to 1:0.4. The amount of unhydrolyzed nonfunctional organosilane in the partial hydrolysis product typically is less than 50 percent by weight of the nonfunctional organosilane compound based on the total weight of starting nonfunctional organosilane compound.

Typically, when a nonfunctional organosilane is utilized as organosilicon-containing material, a nonfunctional organosilane corresponding to formula (VI) in which Y corresponds to $-OR^1$ as defined above is employed.

Examples of nonfunctional organosilanes corresponding to the above formula, (VI), include methyl trimethoxy silane, dimethyl dimethoxy silane, methyl triethoxy silane, dimethyl diethoxy silane, dimethoxy diphenyl silane, dimethoxy methyl phenyl silane, diethoxy dipropyl silane, dimethoxy dipropyl silane, and the like. Additional examples of the nonfunctional organosilanes include amyl triethoxy silane and triethoxy silane. Compounds such as trimethyl methoxy silane, trimethyl ethoxy silane, and ethoxy tripropyl silane may be employed if desired in limited, controlled amounts for modification purposes.

The nonfunctional organosilanes contribute to water resistance, toughness, and stain resistance of cured films prepared from compositions of the invention based on ungelled partial hydrolysis products which incorporate these nonfunctional organosilanes. Trialkoxysilanes corresponding to formula (VI) above (i.e., m equals 1 and Y represents $-OR^1$) are preferred, those in which $R^8$ represents hydrogen, methyl, ethyl, or phenyl and $-OR^1$ represents methoxy or ethoxy being more preferred, and those in which $R^8$ represents methyl and $-OR^1$ represents methoxy being most preferred. Moreover, the dimethyl dialkoxy silanes corresponding to formula (VI) above are less desirable than the trialkoxy silanes since it is believed that the dimethyl dialkoxy silanes tend to decrease the adhesion to the substrate of cured films prepared from compositions of the invention incorporating the dimethyl dialkoxy silanes.

As stated above, trialkoxy silanes corresponding to formula (VI) such as methyl trimethoxy silane are especially preferred as organosilicon-containing material. Phenyl trialkoxy silane or trialkoxy silanes wherein $-R^8$ in formula (VI) is represented by an aliphatic group containing more than about 10 carbon atoms are less desirable than methyl trimethoxy silane since they tned to decrease the ease of curing of the ungelled partial hydrolysis products and compositions of the invention containing such hydrolysis products. However, phenyl trialkoxy silanes often help the weatherability of films when properly cured, for example at temperatures above about 250 degrees F. (121 degrees C.) in the presence of a catalyst.

Where desired, a nonfunctional organosilane containing higher alkoxy, aryloxy, alkylaryloxy, arylalkyloxy, alkyloxyalkyloxy, and/or aryloxyalkyloxy moieties as defined previously may be used as organosilicon-containing material. Organosilicon-containing materials containing such moieties may be prepared, for example, by reacting a nonfunctional organosilane such as methyl trimethoxy silane with a suitable monohydric alcoholic or monohydric phenolic material so as to provide higher alkoxy, aryloxy, alkylaryloxy, arylalkyloxy, alkyloxyalkyloxy, and/or aryloxyalkyloxy moieties to the nonfunctional organosilane. Examples of such organosilanes include: pentoxy dimethoxy methyl silane, isopentoxy dimethoxy methyl silane, 2-ethylhexoxy dimethoxy methyl silane, 2-butoxyethoxy dimethoxy methyl silane, phenoxy dimethoxy phenyl silane, tolyloxy dimethoxy methyl silane, phenylethyloxy dimethoxy methyl silane, and the like.

(3) Suitable organosilicon-containing materials include functional organosilanes. As used herein, a "functional organosilane" is intended to include materials corresponding to the following formula, VII, $$F-G-SiY_3, \qquad (VII)$$

wherein
G represents an organo group containing from 2 to 10 carbon atoms,
Y represents $-OR^1$,

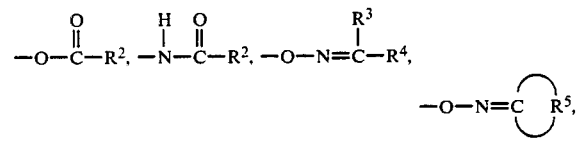

and the monohydroxy and/or cyclic $C_2$-$C_3$ residue of a 1,2- or 1,3-glycol, wherein
$R^1$ represents $C_1$-$C_3$ alkyl, preferably $C_1$-$C_2$ alkyl, and more preferably methyl,
$R^2$ independently represents H or $C_1$-$C_4$ alkyl,
$R^3$ and $R^4$ independently represent H, $C_1$-$C_4$ alkyl, or $C_6$-$C_8$ aryl and
$R^5$ represents $C_4$-$C_7$ alkylene, and
F represents amino, polyamino, 1,2-epoxy, mercapto, halo, cyano, isocyanato, ureido, imidazolinyl, acrylato, methacrylato, or a group corresponding to $-SiY_3$, wherein Y is as defined above.

In accordance with the discussion of the distinction between nonfunctional organosilanes and functional organosilanes as these terms are used herein, groups defined by F above are considered to be the "functional" groups encompassed by the term "functional organosilane." It also should be understood that compounds such as vinyl trimethoxy silane, vinyl triethoxy silane, allyl trimethoxy silane and allyl triethoxy silane, which contain functional groups such as allyl and vinyl, while not literally corresponding to formula (VII) above, are considered herein to fall within the meaning of functional organosilanes. Some examples of functional organosilanes include gamma-aminopropyl trimethoxy silane, gamma-aminopropyl triethoxy silane, beta-aminoethyl trimethoxy silane, beta-aminoethyl triethoxy silane, N-beta-aminoethylaminopropyl trimethoxy silane, gamma-isocyanatopropyl triethoxy silane, vinyl trimethoxy silane, vinyl triethoxy silane, allyl trimethoxy silane, allyl triethoxy silane, mercaptopropyl trimethoxy silane, mercaptoethyl trimethoxy silane, mercaptopropyl triethoxy silane, glycidoxypropyl trimethoxy silane, glycidoxypropyl triethoxy silane, 4,5-epoxycyclohexylethyl trimethoxy silane, ureidopropyl trimethoxy silane, ureidopropyl triethoxy silane, chloropropyl trimethoxy silane, chloropropyl triethoxy silane, cyanopropyl trimethoxy silane, and

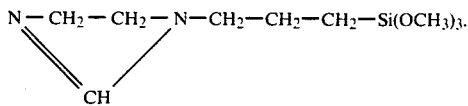

It will be appreciated that functional organosilanes containing mutually reactive functional groups such as 1,2-epoxy and amino, or amino and isocyanato, etc., or groups defined by F above which are reactive with groups defined by Y above, should be employed in controlled amounts to prepare the ungelled partial hydrolysis products so as to avoid gelation or products of undesirably high viscosity.

Although the incorporation of the functional organosilanes in the organosilicon-containing material may be desirable for some purposes, functional organosilanes tend to be costly. It has been found that cured compositions of the invention having excellent properties can be made from ungelled partial hydrolysis products of the invention from organosilicon-containing material in which the amount of such functional organosilanes is minimized or even eliminated. However, function organosilanes often can help with the compatibility with other organic materials, with adhesion to substrates, and can be utilized for curing through the functional group F with coreactive groups. Moreover, for some purposes, ungelled partial hydrolysis products prepared from organosilicon-containing material containing a mixture of nonfunctional organosilane and amino-containing functional organosilane are desirable.

(4) It is to be understood that mixtures of (1) the optional organosilicates, and/or (2) the nonfunctional organosilanes, and/or (3) the functional organosilanes may be employed in the organosilicon-containing material containing greater than or equal to 10 mole percent of at least one organosilane compound corresponding to the formula (I) above, namely R—Si—Y$_3$, for preparation of the ungelled partial hydrolysis products.

As indicated previously herein, the ungelled partial hydrolysis product is prepared by hydrolyzing easily hydrolyzable groups of the organosilane compound(s) with a controlled amount of water wherein the amount of water employed in the controlled hydrolysis is determined according to the above formula (II). For example, just one useful mixture of organosilanes, suitable as the organosilicon-containing material for preparation of an ungelled partial hydrolysis product of the invention, can contain methyl trimethoxy silane, phenyl trimethoxy silane, and methyl phenyl dimethoxy silane respectively in a molar ratio of 1.00 to 0.351 to 0.117. Such a mixture would provide 3.00 equivalents of methoxy groups from the methyl trimethoxy silane, 1.05 equivalents of methoxy groups from the phenyl trimethoxy silane, and 0.234 equivalents of methoxy groups from the methyl phenyl dimethoxy silane. Thus in formula (II) above, E$_{1,2}$ would equal 0.234 and E$_{3,4}$ would equal 4.05; and assuming the maximum amount of water allowed by the formula (i.e., Z=0.43), the total moles of water for preparation of the partial hydrolysis product would equal 1.86 moles. Or in other words, a maximum of 1.27 moles of water per mole or organosilane compound (i.e., 1.86 moles/1.468 moles equals 1.27).

In preparing an ungelled, partial hydrolysis product a controlled amount of water according to formula (II) above is utilized. Generally, the ungelled partial hydrolysis product will contain condensation product compounds having one or more siloxane linkages represented by the formula, (V),

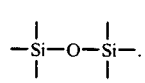

The hydrolysis and condensation reactions believed to be involved in the preparation of the ungelled partial hydrolysis products typically may be illustrated as follows:

and

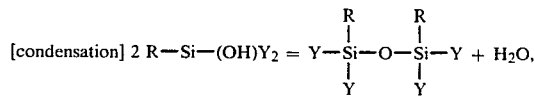

wherein R and Y represent groups as defined in formula (I) above. The amount of organosilane compound (i.e., R—Si—Y$_3$) remaining after hydrolysis and condensation in the ungelled partial hydrolysis product typically is less than 50 percent by weight based on the total weight of starting organosilane compound. Of course it will be understood that the relative amounts of constituents in the partial hydrolysis product can be adjusted, for example by distilling off a portion, as desired, of volatile constituents from the partial hydrolysis product.

It will be appreciated from the disclosure herein, that the ungelled partial hydrolysis products, considering that they are prepared utilizing such a small, controlled amount of water, will contain a mixture of low molecular weight compounds which contain residual hydrolyzable Y groups. The ungelled partial hydrolysis products typically will contain greater than 5.0, and usually greater than 8.0, milliequivalents of residual hydrolyzable Y groups per gram of ungelled partial hydrolysis product. There is also the possibility that the ungelled partial hydrolysis products also contain a small amount of silanol-type (≡Si—OH) hydroxyl groups; however the ungelled partial hydrolysis products generally will contain a ratio of residual hydrolyzable Y groups to silanol-type hydroxyl groups greater than 1.00, and typically greater than 3.00. Too high a level of silanol-type hydroxyl groups in hydrolyzed organosilane products tends to render the hydrolysis products incompatible with organic solvents to a disadvantageous degree, thereby significantly limiting their utility for organic solvent-borne compositions such as, for example, essentially nonaqueous, organic solvent-borne coating compositions of the invention.

The partial hydrolysis of the organosilicon-containing material containing greater than or equal to 10 mole percent of at least one organosilane compound corresponding to the formula (I), namely R—Si—Y$_3$, typically is conducted in the presence of from 0.01 to 20 percent by weight of a catalyst, which in some instances also can function as a coreactant, examples of which catalyst include gamma-aminopropyl triethoxy silane, isophorone diamine, 2-amino-2-methyl-1-propanol, or the like. The percent by weight of catalyst is based on the total weight of the organosilicon-containing material. Sometimes a solvent such as methanol or ethanol is desirable to render the organosilicon-containing material compatible with water in order to obtain a more desirable product.

The ungelled partial hydrolysis product typically contains an amount of hydrolyzable Y groups such that the ratio of the number of grams of the ungelled partial hydrolysis product to equivalents of the hydrolyzable Y groups in the ungelled partial hydrolysis product is in a range of from 40 to 300, usually in a range of from 50 to 200. In other words, the "hydrolyzable group equivalent weight" of the ungelled hydrolysis product typically is in a range of from 40 to 300, usually in a range of from 50 to 200. Thus, the ungelled partial hydrolysis product typically will contain from 25 to 3.33 milliequivalents, and usually from 20 to 5.0 milliequivalents, of hydrolyzable Y groups per gram of partial hydrolysis product.

Examples of some preferred partial hydrolysis products for compositions of the invention, in terms of the approximate makeup of components contained therein, which would tend to be compatible with the constituents of a number of acrylic addition interpolymers include (a) a partial hydrolysis product containing from 10 to 90 percent by weight, preferably from 10 to 50 percent by weight, based on the total weight of the partial hydrolysis product, of a component substantially corresponding to the formula (VIII), i.e. $R-Si(OR^6)_3$ wherein R is as defined for formula (I) above, namely for $R-Si-Y_3$, and $R^6$ independently represents a $C_1-C_3$ alkyl group, preferably a $C_1-C_2$ alkyl group, and more preferably methyl, as well as from 10 to 90 percent by weight, preferably from 10 to 50 percent by weight, based on the total weight of the partial hydrolysis product, of a component substantially corresponding to the formula

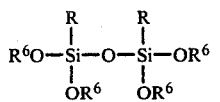

wherein R is as defined for formula (I) above, and $R^6$ is as defined for formula (VIII) above; (b) a partial hydrolysis product containing from 10 to 80 percent by weight, preferably from 10 to 60 percent by weight, based on the total weight of the partial hydrolysis product, of a component substantially corresponding to the aforesaid formula (VIII), as well as from 10 to 80 percent by weight, preferably from 10 to 60 percent by weight, based on the total weight of the partial hydrolysis product, of a component substantially corresponding to the formula

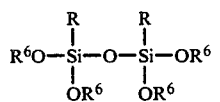

where R is as defined for formula (I) above, and $R^6$ is as defined for formula (VIII) above, as well as from 10 to 90 percent by weight, preferably from 30 to 80 percent by weight, based on the total weight of the partial hydrolysis product, of a component substantially corresponding to the formula

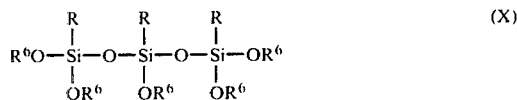

wherein R is as defined for formula (I) above, and $R^6$ is as defined for formula (VIII) above; and (c) a partial hydrolysis product containing from 10 to 80 percent by weight, preferably from 20 to 60 percent by weight, based on the total weight of the partial hydrolysis product, of a component substantially corresponding to the formula

wherein R is as defined for formula (I) above, and $R^6$ is as defined for formula (VIII) above, as well as from 10 to 80 percent by weight, preferably from 20 to 60 percent by weight, based on the total weight of the partial hydrolysis product, of a component substantially corresponding to the formula

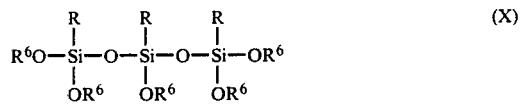

wherein R is as defined for formula (I) above, and $R^6$ is as defined for formula (VIII) above. A product corresponding to that described in part (c) above can be obtained as residue, for example, by removing from the partial hydrolysis product described in part (b) above the more volatile component $R-Si(OR^6)_3$ by distillation at a temperature of less than or equal to 160 degrees Celsius (C.) optionally under reduced pressure (i.e., a so called "vacuum distillation"). Moreover, a product corresponding to that described in part (a) immediately above can be obtained, for example, as distillate by removing from the partial hydrolysis product described in part (b) above the more voltatile components, $R-Si(OR^6)_3$ and that corresponding to formula (IX), by distillation at a temperature of less than or equal to 160 degrees Celsius (C.) optionally under reduced pressure. It should also be understood that the partial hydrolysis products will also contain some materials of higher molecular weight than those represented by formula (X) above.

Additionally, the examples of preferred partial hydrolysis products described immediately above also serve as preferred reactants for the acrylic polyols when the aforesaid third type of acrylic addition interpolymer is utilized as component (B) in a composition of the invention.

Various types of acrylic addition interpolymers for compositions of the invention may be prepared by various methods.

For example, a first type of acrylic addition interpolymer may be prepared by hydrosilylation of an acrylic addition interpolymer containing carbon-carbon double bonds with a hydrosilane examples of which hydrosilanes include halogenated silanes such as methyldichlorosilane, trichlorosilane, and phenyl dichlorosilane; alkoxysilanes such as methyldiethoxysilane, methyldimethoxysilane, phenyldimethoxysilane, trimethoxysilane, and triethoxysilane; acyloxy silanes such as methyldiacetoxysilane, phenyldiacetoxysilane, and triacetoxysilane; ketoxymate silanes such as bis(dimethylcyclohexylketoxymate)methylsilane, and bis(cyclohexylketoxymate)methylsilane; alkenyloxysilanes such as methyldiisopropenoxysilane, and triisopropenoxysilane; and other silanes such as methyldiaminoxysilane, triaminoxysilane, methyldiaminosilane and triaminosilane. The carbon-carbon double bonds can be incorporated into the addition interpolymer by employing compounds such as allyl compounds examples of which include allyl acrylate and allyl methacrylate. The reaction of the hydrosilane with the acrylic addition interpolymer containing carbon-carbon double bonds employs a catalyst of a transition metal complex, examples of which transition metals include platinum, rhodium, cobalt, palladium and nickel. Reference can be made to U.S. Pat. Nos. 4,191,713 and 4,399,261 regarding process conditions for carrying out hydrosilylation reactions.

A second type of acrylic addition interpolymer is prepared by addition polymerizing at least two components, i.e., one or more ethylenically unsaturated silicon-free monomers and an unsaturated organosilane compound such as an ethylenically unsaturated alkoxysilane monomer, an ethylenically unsaturated acyloxysilane monomer or a mixture thereof. The term "ethylenically unsaturated" is employed in a broad sense and is intended to encompass, for example, vinyl compounds, acrylic compounds and methacrylic compounds. The basic criteria with respect to the ethylenically unsaturated monomer are that it contains at least one ethylenic carbon to carbon double bond, that it is copolymerizable without gelation with the the silane monomer component, and that it does not otherwise preclude the utilization of the finished interpolymer.

Examples of suitable ethylenically unsaturated silicon-free monomers for preparing the second type of acrylic addition interpolymer include the acrylates, such as methyl acrylate, ethyl acrylate, butyl acrylate, propyl acrylate, isobornyl acrylate, and 2-ethylhexyl acrylate; the methacrylates, such as methyl methacrylate, butyl methacrylate, isobornyl methacrylate, 2-ethylhexyl methacrylate, decyl methacrylate, and lauryl methacrylate; and unsaturated nitriles, such as acrylonitrile, methacrylonitrile and ethacrylonitrile. Still other ethylenically unsaturated monomers which can be used include: vinyl aromatic hydrocarbons such as styrene, alpha methyl styrene, and vinyl toluene; vinyl acetate; vinyl chloride; and epoxy functional monomers such as glycidyl methacrylate.

In practice, in order to produce desirable properties in the second type of acrylic interpolymer, it is preferred to use combinations of ethylenically unsaturated silicon-free monomers which form hard polymer segments, such as styrene, vinyl toluene and alkyl methacrylates having from 1 to 4 carbon atoms in the alkyl group with monomers which form soft polymer segments, such as the alkyl esters of acrylic or methacrylic acid, the alkyl groups having from 1 to 13 carbon atoms in the case of acrylic esters and from 5 to 16 carbon atoms in the case of methacrylic esters. Illustrative of monomers which form soft polymer segments are ethyl acrylate, butyl acrylate, 2-ethylhexyl acrylate, 2-ethylhexyl methacrylate, decyl methacrylate, and lauryl methacrylate. In addition to the hardening and softening monomers, as previously indicated, other monomers such as vinyl acetate, vinyl chloride, vinyl toluene, and acrylonitrile may be included to achieve specific properties in the interpolymer. This second type of acrylic addition interpolymer is formed generally from about 50 percent, preferably from about 70 percent to about 90 percent by weight of the ethylenically unsaturated silicon-free monomers based on the total weight of all monomers utilized for preparing the interpolymer.

The other component for preparing the second type of acrylic addition interpolymer is an unsaturated organosilane compound, usually an ethylenically unsaturated alkoxysilane, an ethylenically unsaturated acyloxysilane or a mixture thereof. Alkoxysilanes which can suitably be employed and are preferred are the acrylatoalkoxysilanes, such as gamma-acryloxypropyltrimethoxysilane and gamma-acryloxypropyldimethoxymethylsilane, as well as the methacrylatoalkoxysilanes, such as gamma-methacryloxypropyltrimethoxysilane, gamma-methacryloxypropyltriethoxysilane, gamma-methacryloxypropyldimethoxymethylsilane and gamma-methacryloxypropyltris(2-methoxyethoxy)silane. Among the above listed alkoxysilanes, gamma-methacryloxypropyltrimethoxysilane is especially preferred because of its greater reactivity. Examples of other alkoxysilanes which may be employed include the vinylalkoxysilanes such as vinyltrimethoxysilane, vinyltriethoxysilane and vinyltris(2-methoxyethoxy)silane. Examples of ethylenically unsaturated acyloxysilanes which may be employed include acrylato-, methacrylato- and vinylacetoxysilanes, such as vinylmethyldiacetoxysilane, acrylatopropyltriacetoxysilane, and methacrylatopropyltriacetoxysilane. The second type of acrylic addition interpolymer is formed from about 10 percent to about 30 percent by weight of the above described ethylenically unsaturated silane monomer based on the total weight of all monomers utilized for preparing the interpolymer.

The second type of acrylic addition interpolymer is prepared by interpolymerizing the ethylenically unsaturated silicon-free monomers with the ethylenically unsaturated silane monomers in the presence of a vinyl polymerization initiator. The preferred intiators are azo compounds such as, for example, alpha alpha'-azobis-(isobutyronitrile); peroxides such as benzoyl peroxide and cumene hydroperoxide; and tertiary butyl peracetate, isopropyl percarbonate, butyl isopropyl peroxy carbonate and similar compounds. The quantity of initiator employed can be varied considerably; however, in most instances, it is desirable to utilize from about 0.1 to about 10 percent based on the weight of monomer solids. A chain modifying agent or chain transfer agent is ordinarily added to the polymerization mixture. The mercaptans, such as dodecyl mercaptan, tertiary dodecyl mercaptan, octyl mercaptan, hexyl mercaptan and mercaptoalkyl trialkoxysilanes, e.g., 3-mercaptopropyltrimethoxysilane, may be used for this purpose as well as other chain transfer agents such as cyclopentadiene, allyl acetate, allyl carbamate, and mercaptoethanol.

Acrylic addition interpolymers of the second type suitable for compositions of the invention may have a wide range of molecular weights. However, typically they have a peak molecular weight, as determined by gel permeation chromatography utilizing a polystyrene standard, of from about 2,000 to about 20,000, preferably from about 2,000 to about 15,000, and most preferably from about 2,000 to about 10,000.

For the second type of acrylic addition interpolymers, the polymerization reaction is carried out in an organic solvent medium utilizing conventional solution polymerization procedures which are well known in the addition polymer art as illustrated with particularity in, for example, U.S. Pat. Nos. 2,978,437; 3,079,434 and 3,307,963. Organic solvents which may be utilized in the polymerization of the monomers include virtually any of the organic solvents heretofore employed in preparing conventional acrylic or vinyl polymers such as, for example, alcohols, ketones, aromatic hydrocarbons or mixtures thereof. Illustrative of organic solvents of the above type which may be employed are alcohols such as lower alkanols containing 2 to 4 carbon atoms including ethanol, propanol, isopropanol, and butanol; ether alcohols such as ethylene glycol monoethyl ether, ethylene glycol monobutyl ether, propylene glycol monomethyl ether, and dipropylene glycol monoethyl ether; ketones such as methyl ethyl ketone, methyl N-butyl ketone, and methyl isobutyl ketone; esters such as butyl acetate; and aromatic hydrocarbons such as xylene, toluene, and naphtha.

A third type of acrylic addition interpolymer, which is preferred for certain embodiments of the invention, has in molecules thereof at least one group containing a silicon atom which group is selected from:

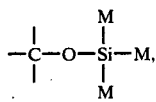
(XI)

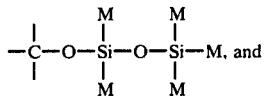
(XII)

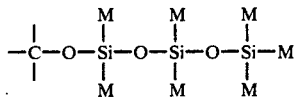
(XIII)

wherein each M, which may be the same or different, represents: Y; hydrogen; a $C_1-C_{10}$ group joined to Si through an Si-C linkage optionally containing a primary amino group, a secondary amino group, a tertiary amino group, a polyamino group, a mercapto group, a methacrylato group, an acrylato group, a urea group, a cyclic urea group, a urethane group, a 1,2-epoxy group, an ester group, an ether group, a thioether group, an amido group, an imidazolinyl group, a cyano group, an allyl group, a vinyl group, and/or a halo group; or a $OR^7$ group in which $R^7$ represents alkyl having at least 4 carbon atoms, aryl, alkylaryl, arylalkyl, aryloxyalkyl, or alkyloxyalkyl. Y in the aforesaid definition represents an easily hydrolyzable group.

In the aforesaid definition of M, it is to be understood that the $C_1-C_{10}$ group joined to Si through an Si-C linkage can be saturated or can contain aromatic and/or ethylenic unsaturation. It is preferred that for the moieties M, which are not Y, that not all of these moieties are phenyl.

Examples of groups which can represent the easily hydrolyzable group Y include $-OR^1$,

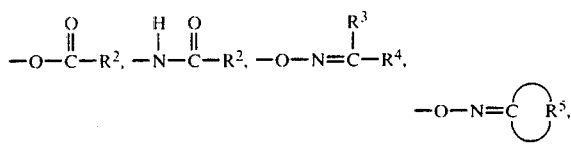

and the monohydroxy and/or cyclic $C_2-C_3$ residue of a 1,2- or 1,3-glycol, wherein $R^1$ represents $C_1-C_3$ alkyl, preferably $C_1-C_2$ alkyl, and most preferably methyl, $R^2$ independently represents H or $C_1-C_4$ alkyl, $R^3$ and $R^4$ independently represent H, $C_1-C_4$ alkyl, $C_6-C_8$ aryl and $R^5$ represents $C_4-C_7$ alkylene.

Of the above examples of easily hydrolyzable groups Y, the groups

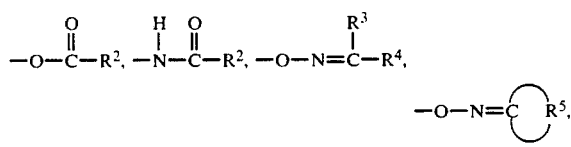

and the monohydroxy and/or cyclic $C_2-C_3$ residue of a 1,2- or 1,3-glycol as defined above, are less preferred than the hydrolyzable group $-OR^1$ as defined above, the groups

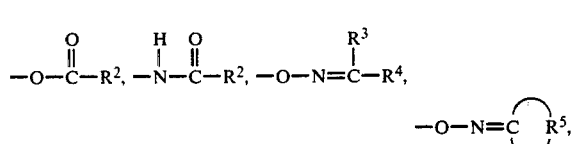

being much less preferred since they contribute to higher weight loss than desired for some applications when compositions of the invention containing such acrylic addition interpolymers containing these groups are cured; and their products upon cure tend to have lower vapor pressures than desired for some applications which may increase the curing times and/or temperatures of compositions of the invention containing these groups. Thus, these groups are less preferable than the aforesaid $-OR^1$ groups, particularly methoxy and ethoxy, where short curing times, low weight loss and low curing temperatures are an important consideration.

In one embodiment of the invention based in part on this third type of acrylic addition interpolymer, at least one M represents $-OR^1$ wherein $R^1$ is a $C_1-C_2$ alkyl group. It is more preferred that at least one M is a methoxy group and at least one M is methyl. U.S. patent application Ser. No. 728,973 filed Apr. 30, 1985 and assigned to the same assignee as the present application, is directed to acrylic resin compositions per se based on this third type of acrylic polymer.

This third type of acrylic addition interpolymer can be prepared, for example, by reacting a hydroxyl-functional acrylic resin with (a) an organosilicon-containing material containing at least 10 percent by weight of the organosilicon-containing material of a compound corresponding to the formula (III), $M-Si(OR^6)_3$ wherein M is as defined for formulas (XI) through (XIII) above, and $R^6$ independently represents a $C_1-C_3$ alkyl group, preferably at least one $OR^6$ group being methoxy; (b) an organosilicon-containing material comprising at least 10 percent by weight of said organosilicon-containing material of a compound corresponding to the formula

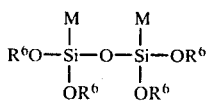
(XIV)

wherein M is as defined for formulas (XI) through (XIII) above, and $R^6$ independently represents a $C_1$-$C_3$ alkyl group, preferably at least one $OR^6$ group being methoxy; (c) an organosilicon-containing material comprising at least 10 percent by weight of said organosilicon-containing material of a compound corresponding to the formula

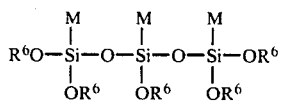
(XV)

wherein M is as defined for formulas (XI) through (XIII) above, and $R^6$ independently represents a $C_1$-$C_3$ alkyl group, preferably at least one $OR^6$ group being methoxy; (d) an organosilicon-containing material comprising a mixture containing at least 10 percent by weight of said organosilicon-containing material of a compound corresponding to the formula $M-Si(OR^6)_3$ and at least 10 percent by weight of said organosilicon-containing material of a compound corresponding to the formula

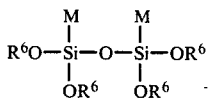

wherein M is as defined for formulas (XI) through (XIII) above, and $R^6$ independently represents a $C_1$-$C_3$ alkyl group, preferably at least one $OR^6$ group being methoxy; or (e) a partial hydrolysis product of a compound corresponding to the formula $M-Si(OR^6)_3$ wherein M is as defined for formulas (XI) through (XIII) above, and $R^6$ independently represents a $C_1$-$C_3$ alkyl group, preferably at least one $OR^6$ group being methoxy; and/or a combination thereof.

Examples of suitable organosilicon-containing materials for preparation of the third type of acrylic addition interpolymer include but are not limited to the following (1) through (4).

(1) Suitable organosilicon-containing materials include organosilicates, including partial hydrolysis products thereof, such as organosilicates corresponding to formula (IV) as set forth in the description of organosilanes for preparation of the ungelled partial hydrolysis products (component A).

Of the organosilicates corresponding to the formula (IV), the tetraalkoxysilanes wherein x equals 0 in formula (IV) are preferred. The tetraalkoxysilanes provide a high degree of functionality to the acrylic addition interpolymer and enhance the ease with which the polymer can be cured. Furthermore, they can be used to attach modifying groups such as those represented by $-OR^7$ in formula (IV), an example of which is a sec-butoxy group. Of the examples of organosilicates described above, tetramethoxysilane is desirable for some purposes because of the ease with which it reacts with the hydroxyl moiety of a hydroxyl-functional acrylic resin. Tetraethoxysilane is also desirable since, although tetraethoxysilane is not as reactive as tetramethoxysilane, it is not as highly volatile as tetramethoxysilane.

As stated previously the partial hydrolysis products of the organosilicates can be used as organosilicon-containing material for preparation of the third type of acrylic addition interpolymer. Hydrolyzed organosilicates provide increased reactive groups per molecule in the acrylic polymers. Additionally, the hydrolyzed organosilicates can help provide low volatility to the compositions of the invention.

In preparing a partial hydrolysis product, for example, from an organosilicate of formula (IV), a controlled amount of water is employed. Typically the hydrolysis product will be prepared utilizing a ratio of moles of the organosilicate to moles of water ranging from 1:0.75 to 1:0.4. A useful guide for determining the amount of water for preparing preferred partial hydrolysis products, where desired from organosilicates, can be found in formula (II) above. The amount of unhydrolyzed organosilicate compound in the partial hydrolysis product typically is less than 50 percent by weight of the organosilicate compound based on the total weight of starting organosilicate compound. Moreover, the partial hydrolysis product typically will contain greater than 5.0, and usually greater than 8.0, milliequivalents of residual easily hydrolyzable groups per gram of the partial hydrolysis product.

Where desired, organosilicates and/or partial hydrolysis products thereof containing higher alkoxy, aryloxy, arylalkyloxy, alkylaryloxy, alkyloxyalkyloxy, and/or aryloxyalkyloxy moieties attached to one or more silicon atoms in addition to the easily hydrolyzable moieties may be employed for preparation of the third type of acrylic addition interpolymer. It is believed that the presence of such higher alkoxy, aryloxy, arylalkyloxy, alkylaryloxy, alkyloxyalkyloxy and/or aryloxyalkyloxy moieties from the organosilicon-containing material provides enhanced hydrolytic stability to such acrylic addition interpolymers and enhanced hydrolytic stability to cured films prepared from such interpolymers when prepared, for example, using such organosilicates as the sole organosilicon-containing material. However, when this third type of acrylic addition interpolymer is prepared from an organosilicate (and/or partially hydrolyzed organosilicate) containing higher alkoxy, aryloxy, arylalkyloxy, alkylaryloxy, alkyloxyalkyloxy, and/or aryloxyalkyloxy moieties, the acrylic polymer should contain a residual amount of the easily hydrolyzable moieties from the organosilicon-containing material. Moreover, the presence of such $OR^7$ type groups in such an acrylic addition interpolymer, can contribute to a slower rate of cure which may be desired for some applications. When an organosilicate is the organosilicon-containing material, the product composition generally will contain from 25 to 1.5 milliequivalents per gram of the product composition of the lower alkoxy moieties $-OR^6$.

(2) Suitable organosilicon-containing materials include nonfunctional organosilanes, including partial hydrolysis products thereof, as set forth in the description of organosilanes corresponding to formula (VI) for preparation of the ungelled partial hydrolysis products (component A).

Partial hydrolysis products of nonfunctional organosilanes can be prepared in a manner similar to the preparation of partial hydrolysis products of organosilicates. In the preparation of a partial hydrolysis product of a nonfunctional organosilane a controlled amount of water is employed. Typically the hydrolysis product will be prepared utilizing a ratio of moles of the nonfunctional organosilane to moles of water ranging from 1:0.75 to 1:0.4. A useful guide for determining the amount of water for preparing preferred partial hydrolysis products, where desired from nonfunctional organosilanes, can be found in formula (II) infra. The amount of unhydrolyzed nonfunctional organosilane in the partial hydrolysis product typically is less than 50 percent by weight of the nonfunctional organosilane compound based on the total weight of starting nonfunctional organosilane compound. Moreover, the partial hydrolysis product typically will contain greater than 5.0, and usually greater than 8.0, milliequivalents of residual easily hydrolyzable groups per gram of the partial hydrolysis product.

Typically, when a nonfunctional organosilane (and/or a partial hydrolysis product thereof) is utilized as organosilicon-containing material, a nonfunctional organosilane corresponding to formula (VI) in which Y corresponds to $-OR^1$ as defined above is employed.

The nonfunctional organosilanes (and/or partial hydrolysis products thereof) contribute to water resistance, toughness, and stain resistance of cured films prepared from compositions of the invention containing the aforesaid third type of acrylic addition interpolymer incorporating these nonfunctional organosilanes (and/or partial hydrolysis products thereof). Trialkoxysilanes corresponding to formula (VI) above (i.e., m equals 1 and Y represents $-OR^1$) are preferred, those in which $R^8$ represents hydrogen, methyl, ethyl, or phenyl and $-OR^1$ represents methoxy or ethoxy being more preferred, and those in which $R^8$ represents methyl and $-OR^1$ represents methoxy being most preferred. Moreover, the dimethyl dialkoxy silanes corresponding to formula (VI) above are less desirable than the trialkoxy silanes since it is believed that the dimethyl dialkoxy silanes tend to decrease the adhesion to the substrate of cured films prepared from compositions of the inventions incorporating the dimethyl dialkoxy silanes.

Trialkoxy silanes corresponding to formula (VI) such as methyl trimethoxy silane (and/or partial hydrolysis products thereof) are especially preferred as organosilicon-containing material.

Where desired, a nonfunctional organosilane (and/or partial hydrolysis products thereof) containing higher alkoxy, aryloxy, alkylaryloxy, arylalkyloxy, alkyloxyalkyloxy, and/or aryloxyalkyloxy moieties as defined previously may be used as organosilicon-containing material. However, when an acrylic resin composition based on the third type of acrylic addition interpolymer is prepared from a nonfunctional organosilane (and/or partially hydrolyzed nonfunctional organosilane) containing higher alkoxy, aryloxy, arylalkyloxy, alkylaryloxy, alkyloxyalkyloxy, and/or aryloxyalkyloxy moieties, the acrylic resin composition should contain a residual amount of the easily hydrolyzable moieties from the organosilicon-containing material. The presence of such $OR^7$ type groups in such an acrylic addition interpolymer can contribute to a slower rate of cure.

(3) Suitable organosilicon-containing materials include functional organosilanes, including partial hydrolysis products thereof, as set forth in the description of organosilanes corresponding to formula (VII) for preparation of the ungelled partial hydrolysis products (component A). It will be appreciated that functional organosilanes containing mutually reactive functional groups such as 1,2-epoxy and amino, or amino and isocyanato, etc., or groups defined by F above which are reactive with groups defined by Y above, should be employed in controlled amounts to prepare the third type of acrylic addition interpolymer so as to avoid gelation or products of undesirably high viscosity.

(4) It is to be understood that mixtures and/or partially hydrolyzed mixtures of (1) the organosilicates (and/or partial hydrolysis products thereof), and/or (2) the nonfunctional organosilanes (and/or partial hydrolysis products thereof), and/or (3) the functional organosilanes (and/or partial hydrolysis products thereof) may be employed as the organosilicon-containing material for reaction with hydroxyl-functional acrylic resins such as acrylic polyols for preparation of the aforesaid third type of acrylic addition interpolymer.

As described above, the third type of acrylic addition interpolymer can be, and usually is, prepared, for example, by reacting a hydroxyl functional acrylic resin with organosilicon-containing materials as described above. Typically the hydroxyl-functional acrylic resin comprises an acrylic polyol.

Acrylic polyols include but are not limited to the known hydroxyl-functional addition polymers and copolymers of acrylic and methacrylic acids and their ester derivatives including but not limited to their hydroxyl functional ester derivatives, acrylamide and methacrylamide, and unsaturated nitriles such as acrylonitrile and methacrylonitrile. Additional examples of acrylic monomers which can be addition polymerized to form acrylic polyols include hydroxyethyl (meth)acrylate, hydroxypropyl (meth)acrylate, methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, n-hexyl (meth)acrylate, cyclohexyl (meth)acrylate, 3,3,5-trimethylcyclohexyl (meth)acrylate, decyl (meth)acrylate, isodecyl (meth)acrylate, lauryl (meth)acrylate, stearyl (meth)acrylate, phenyl (meth)acrylate, and isobornyl (meth)acrylate.

Additional examples of compounds which may be employed in the preparation of hydroxyl-functional acrylic resins, or as the hydroxyl-functional acrylic resins, for reaction with organosilicon-containing material include: compounds produced by the reaction of lactones such as caprolactone with hydroxyl functional acrylic esters such as hydroxy ethyl acrylate and hydroxy propyl acrylate; epoxy-exters produced by the reaction of fatty acids, especially monocarboxylic fatty acids, with ethylenically unsaturated epoxides such as glycidyl acrylate and glycidyl methacrylate; and free radical addition copolymers of acrylic monomers such as those described previously herein with ethylenically unsaturated anhydrides such as maleic anhydride in which the anhydride rings are reacted with a polyol such as a low molecular weight diol.

Where desired, various other unsaturated monomers can be employed in the preparation of hydroxyl-functional acrylic resins such as acrylic polyols, examples of which include: vinyl aromatic hydrocarbons such as styrene, alpha-methyl styrene, and vinyl toluene; vinyl acetate; vinyl chloride; and unsaturated epoxy functional monomers such as glycidyl (meth)acrylate. For convenience, the term "(meth)acrylate" has been used herein to denote either or both of the respective acrylate compound and the respective methacrylate compound. Acrylic polyols for preparation of the third type of acrylic addition interpolymer typically have a weight raverage molecular weight determined be gel permeation chromatography using a polystyrene standard of from 600 to 50,000. Moreover, acrylic polyols for preparation of the third type of acrylic addition interpolymers typically have a hydroxyl equivalent weight of from 116 to 1,000.

The above examples of hydroxyl-functional acrylic resins should be considered to be merely illustrative of hydroxyl-functional acrylic resins which may be utilized for preparation of the third type of acrylic addition interpolymer.

When the third type of acrylic polymer is prepared by reaction of an acrylic polyol and an organosilicon-containing material as described above, the acrylic polyol and the organosilicon-containing material are reacted typically under a blanket of a nonreactive gas such as nitrogen at a temperature ranging from about 50 degrees C. to about 180 degrees C. for 0.5 to 50 hours usually with removal by distillation of the low boiling volatile reaction product such as the volatile alcohol. If distillate is removed, a fractionating column may be used as a precaution to prevent removal of the starting materials. Depending on the vapor pressures of the starting materials, for example where materials having high vapor pressures are employed, often the reaction is conducted under pressure.

Often the starting materials do not form a homogeneous mixture at ambient temperature to begin with; however as the reaction is carried out the materials usually form a homogeneous mixture as the reaction proceeds. Moreover, materials such as gamma-glycidoxypropyl trimethoxy silane, QP8-5314 (a mixture of 25 mole percent methylphenyldimethoxysilane and 75 mole percent phenyltrimethoxysilane providing 14.9 moles of methylphenyldimethoxysilane and 44.7 moles of phenyltrimethoxysilane; available from Dow Corning Corp.), and n-methylpyrrolidone can be utilized in the reaction mixture to aid in rendering the starting materials compatible.

Depending on the choice of reactants and optionally catalysts, the reaction may be conducted under milder or more severe conditions of time and temperature. For example, the reaction may be conducted at a temperature such as 80 degrees C. for about 1 hour with removal of alcohol. Or where the reaction is carried out without a catalyst, the reaction may be conducted for example at 175 degrees C. for 3 hours. The presence of a catalytic amount of catalyst such as stannous octoate facilitates removal of volatile alcohol. Typically, a solvent is included in the reaction medium. A limited amount of solvent often is desired particularly where the product is to be used in a high solids coating composition.

Depending on the particular choice of reactants, the reaction between the organosilicon-containing material and hydroxyl-functional acrylic resin may be sluggish, and where desired, a catalyst may be utilized to speed up the reaction. Examples of such catalysts include: acids such as paratoluenesulfonic acid; tin-containing compounds such as butylstannoic acid, dibutyl tin oxide, stannous octoate and dibutyl tin dilaurate; titanates such as tetraisopropyltitanate and tetrabutyltitanate; amino compounds such as aminopropyltriethoxysilane, isopropanol amine, 2-amino-2-methyl-1-propanol, isophorone diamine, 2,2,4-trimethyl hexamethylene diamine, and the like. Of course, where functional organosilanes as described previously herein are employed for organosilicon-containing material, the choice of catalyst will be in part governed by the functional groups present so as to avoid gelation. Moreover, the extent of reaction should be controlled so as to avoid gelation. The extent of reaction can be monitored by following the amount of product HY given off during the reaction. When catalysts are utilized in the preparation of the third type of acrylic addition interpolymer, reaction temperatures lower than about 120 degrees C. are feasible.

When the third type of acrylic addition interpolymer is prepared from the reaction of an organosilicon-containing material as described above and a hydroxyl-functional acrylic resin such as an acrylic polyol, the amounts by weight of the organosilicon-containing material and the hydroxyl-functional acrylic resin for preparation of the acrylic interpolymer may vary. Depending on the particular choice of hydroxyl-functional acrylic resin and organosilicon-containing material, the mole ratio of hydroxyl moieties (i.e., C—OH) from the hydroxyl-functional acrylic resin to hydroxyl-reactive Y moieties, for example such as lower alkoxy moieties, from the organosilicon-containing material may vary. However, an amount of hydroxyl-functional acrylic resin and an amount of organosilicon-containing material generally will be chosen and the extent of reaction controlled such that the ungelled product composition will contain an amount of the Y moieties such that the ratio of the number of grams of ungelled product composition to equivalents of the Y moieties in the ungelled product composition is in a range of from 40 to 667, preferably in a range of from 40 to 400, and more preferably in a range of from 40 to 200. A useful guide is to choose the hydroxyl-functional acrylic resin and organosilicon-containing starting materials so as to provide a ratio of equivalents of hydroxyl moieties from the hydroxyl-functional acrylic resin to equivalents of hydroxyl-reactive Y moieties, such as lower alkoxy moieties, from the organosilicon-containing material ranging from 1:2 to 1:100. Typically a ratio of equivalents of 1:3 to 1:20 is employed. It will be understood that 1 equivalent of hydroxyl moieties equals 1 mole of hydroxyl moieties and 1 equivalent of the reactive Y moieties equals 1 mole of the hydroxyl-reactive Y moieties. The ungelled product generally will contain a total content of Y moieties of from 25 to 1.5 milliequivalents, preferably of from 25 to 2.5 milliequivalents, more preferably of from 25 to 5.0 milliequivalents, per gram of ungelled product composition. Moreover, typically the content of hydroxyl moieties (i.e., C—OH) in the ungelled reaction product from the hydroxyl-functional acrylic resin will range from 0 milliequivalents to 10 milliequivalents per gram of reaction product, usually from 0 to 5 milliequivalents per gram of reaction product. As used herein, one milliequivalent of either the hydroxyl moiety (i.e., C—OH) or the moiety Y bonded to Si is equal to one millimole.

Examples of catalysts for curing compositions of the invention include: acids such as paratoluenesulfonic acid; tin-containing compounds such as butylstannoic acid, dibutyl tin oxide, stannous octoate and dibutyl tin dilaurate; titanates such as tetraisopropyltitanate and tetrabutyltitanate; and amino compounds such as gamma-aminopropyltriethoxysilane, isopropanol amine, 2-amino-2-methyl-1-propanol, trimethylene diamine, isophorone diamine and the like.

Compositions of the invention have a broad range of application and may be utilized, for example, as coating compositions, inks, sealants, etc. It has been found, for example, that compositions of the invention can provide topcoatings for wood substrates which exhibit an outstanding combination of properties compared to nitrocellulose lacquers which have long been utilized as topcoating compositions in the wood furniture industry. Moreover, it has been found that compositions of the invention can provide automotive quality coatings having excellent appearance properties for both original equipment manufacture and automotive refinishing applications. Such compositions can be cured at low temperatures (less than 180 degrees F., 82.2 degrees C.). Preferred compositions of the invention for automotive refinishing applications can be cured at ambient temperature (e.g., 25 degrees C.) in the presence of atmospheric moisture.

A nonaqueous coating composition of the invention is essentially free of water. That is, when water is present in a nonaqueous coating composition of the invention, it is present in an insubstantial amount, typically in an amount of less than 1 percent by weight of water based on the total weight of the coating composition. Of course, it is to be understood that small residual amounts of water as contained, for example, in commercially available ingredients suitable for use in organic solvent-borne coating compositions are tolerable. Examples of solvents which may be utilized in nonaqueous coating compositions of the invention include: alcohols, such as methanol, ethanol, propanol, butanol and the like; the mono- and dialkyl ethers of ethylene and propylene glycol such as ethylene glycol monoethyl ether, ethylene glycol monobutyl ether, ethylene glycol dibutyl ether, ethylene glycol monoethyl ether acetate, ethylene glycol monohexyl ether acetate, propylene glycol monoethyl ether and propylene glycol dibutyl ether; the mono- and dialkyl ethers of diethylene glycol such as diethylene glycol monoethyl ether, diethylene glycol dibutyl ether, diethylene glycol diethyl ether and diethylene glycol monobutyl ether acetate; ketones such as methylethyl ketone and methylamyl ketone; esters such as butylacetate; hydrocarbons such as xylene and toluene; and mixtures thereof. As used herein, the term "solvents" includes not only true solvents, but also liquid diluents for the constituents of nonaqueous coating compositions of the invention.

Compositions of the invention may be applied to substrates using any suitable technique such as brushing, dipping, spraying, roll coating, doctor blade coating, curtain coating, etc.

Compositions of the invention may be pigmented or unpigmented and may be utilized in the presence of various generally known additives such as flow control agents, surfactants, leveling agents, anti-mar agents, fungicides, mildewcides, and the like. Examples of pigments include any of the generally known pigments including extender pigments used in the coatings and resins industry such as titanium dioxide, magnesium carbonate, dolomite, talc, zinc oxide, magnesium oxide, iron oxides red and black, barium yellow, carbon black, strontium chromate, lead chromate, molybdate red, chromoxide green, cobalt blue, organic pigments of the azo series, metallic flake pigments such as aluminum flakes and nickel flakes, etc. Mixtures of pigments also may be employed.

Compositions of the invention are suitable for utilization in low solids and high solids coating applications. A high solids coating composition as defined herein typically contains at least 50 percent preferably at least 60 percent, and most preferably at least 70 percent, by weight resin solids based on the weight of that portion of the composition including the required components (i.e., acrylic addition interpolymer and the partial hydrolysis product) and organic solvent but excluding the weight of pigments, fillers and the like which may be present in the coating composition. However, where desired, solvents which are compatible with the reactants can be employed. Moreover, the product may be thinned with solvent. Examples of such solvents include conventional ketones such as methyl ethyl ketone, hydrocarbons such as xylene and toluene, the mono- and dialkylethers of diethylene glycol such as diethylene glycol dibutyl ether and diethylene glycol diethyl ether and low molecular weight alcohols such as methanol and ethanol. Moreover, it has been found that low molecular weight alcohols such as methanol and ethanol can be utilized to enhance the stability of compositions of the invention.

Most of the compositions of the invention are storage stable for periods of at least 3 months, preferably for one year in airtight containers so as to prevent the introduction of moisture into the composition containing the composition. Where desired, they may be stored under dry nitrogen. Also, composition compatible materials which easily hydrolyze so as to act as scavengers for water may be combined with the composition. Examples of such easily hydrolyzable product compatible materials include organosilicates, organosilanes, or materials such as ethylorthoformate and 2,2-dimethoxy propane.

The following examples illustrate the invention and are not to be construed as limiting it to their details. As used herein, "pbw" means "parts by weight". All parts and percentages in the examples and throughout the specification are by weight unless specifically indicated otherwise.

EXAMPLE 1

(a) This part illustrates the preparation of an acrylic silane addition interpolymer utilized in a composition of the invention. The following monomers are used to make the silane addition interpolymer:

| | Percent by Weight |
|---|---|
| Methyl methacrylate | 40.0 |
| Styrene | 25.0 |
| Gamma-methacryloxy-propyltrimethoxysilane | 25.0 |
| 2-ethylhexyl methacrylate | 10.0 |

A reaction vessel equipped with condenser, stirrer, thermometer and means for maintaining a nitrogen blanket is charged with 448.0 grams (g) butyl acetate, 192.0 g VM & P naphtha and 128.0 g toluene. The contents of the vessel are then heated to reflux, about 119 degrees Celsius (°C.), while under a nitrogen blanket and agitation. Three charges are next made simultaneously while maintaining the vessel at reflux conditions. Charge I consists of a mixture of 768 g methyl methacrylate, 480 g styrene, 480 g gamma-methacryloxypropyl trimethoxy silane and 192 g 2-ethylhexyl methacrylate. Charge II consists of a solution of 96 g of 2,2'-azobis(2,4-dimethylvaleronitrile (available as VAZO 67) in 224 g butyl acetate. Charge III consists of a solution of 96 g mercaptopropyl trimethoxy silane in 224 g butyl acetate. The three charges are completed after 2 hours, at which time a solution of 7.68 g VAZO 67 in 32 g butyl acetate is added. The vessel's contents are maintained at reflux for another hour. Next, a solution of 7.68 g VAZO 67 in 32 g butyl acetate is added to the vessel and the vessel's contents is allowed to reflux for 1½ hours. The heat is removed from the vessel and the contents are allowed to cool.

The resultant product has a solids content of 58.0 percent (%) by weight, a viscosity of 1.35 Stokes and an acid value of 0.2. An analysis of the product (silane addition interpolymer) shows it to have a peak molecular weight of 3,776 was determined by gel permeation chromatography, using a polystyrene standard.

(b) This part illustrates the preparation of an ungelled partial hydrolysis product of an organosilicon-containing material prepared utilizing a controlled amount of water.

A reaction vessel equipped with condenser, stirrer, addition funnel, thermometer, distillation column and a nitrogen inlet is charged at ambient temperature with 7466.4 g methyl trimethoxy silane, 75.4 g aminopropyl triethoxy silane, and 1952 g of a condensation product of 1 mole of hexamethoxymethyl melamine (available as CYMEL 300) and 2 moles of trimethylpentanediol. The contents of the vessel are heated to 30° C. Next, 497.8 g of water is added over a period of 55 minutes. Next, the mixture is heated to reflux (about 70° to 74° C.) and held for 2 hours and 30 minutes at reflux. The vessel is allowed to cool to room temperature overnight. Next, 58.3 g trimethylhexamethylene diisocyanate is added to the contents of the vessel and the vessel is equipped for distillation. The contents are heated to 68° C. over a period of 2 hours at which temperature distillation is observed to begin. The contents of the vessel are distilled over a period of 5 hours while the pot temperature ranges between 68° C. and 138° C. at the end of which period a total of 3,793 g of distillate has been collected.

The resulting product contains an ungelled partial hydrolysis product of an organosilicon-containing material prepared utilizing a controlled amount of water.

(c) This part illustrates the preparation of a coating composition of the invention. The composition is prepared by mixing the following ingredients:

| Component | Parts by Weight (g) |
| --- | --- |
| Product of part (a) above | 50.0 |
| Product of part (b) above | 34.1 |
| Silver metallic pigment paste[1] | 84.7 |
| A 75/25 by volume mixture of butyl acetate and methylamyl ketone | 123.2 |
| Lacquer thinner blend available from PPG Industries, Inc. as DITZLER DTU 501 | 152.3 |

(d) The coating composition of part (c) immediately above is spray applied (74 degrees Fahrenheit, 74° F., 23° C., 40 percent relative humidity) in 4 to 5 coats to a metal substrate having thereon a primer (available as DITZLER DZ3 from PPG Industries, Inc.) which has been sanded with 400 grit paper. The resulting coating is allowed to cure at ambient temperature to a cured film having a 20 degree gloss of 79, a distinctness of image (DOI) of 60, a Sward hardness of 20 and a pencil hardness of 2B.

EXAMPLE 2

(a) An acrylic silane addition interpolymer is prepared in a manner to that illustrated in part (a) of Example 1 above. The following monomers are used to make the silane addition interpolymer:

|  | Percent by Weight |
| --- | --- |
| Methyl methacrylate | 60.0 |
| Butyl acrylate | 20.0 |
| Gamma-methacryloxy-propyltrimethoxysilane | 20.0 |

In the preparation of the acrylic silane addition interpolymer of this example, a total of 3.30% by weight VAZO 67 and 5.0% by weight of mercaptopropyl trimethoxy silane is utilized based on 100 pbw of the above monomers. The solvent content of the resulting product is 75.0% by weight butyl acetate, 15.0% by weight VM & P naphtha and 10% by weight toluene. The product has a viscosity of 1.5 Stokes, an acid value of 0.1 and total solids content of 58.2% by weight determined for 2 hours at 150° C.

(b) This part illustrates the preparation of an ungelled partial hydrolysis product of an organosilicon-containing material prepared utilizing a controlled amount of water.

A reaction vessel equipped with condenser, stirrer, addition funnel, thermometer, distillation column, and means for maintaining a nitrogen blanket is charged at ambient temperature with 15,570 g of methyltrimethoxysilane (available as A-163 from Union Carbide), and 157.4 g of gamma-aminopropyltriethoxysilane (available as A-1100 from Union Carbide), and the controlled addition of water to the contents of the vessel is begun. While the contents of the vessel are stirred, a total of 1,133.8 g of deionized water is added slowly to the vessel over a period of 2 hours and 10 minutes while the temperature of the contents of the vessel (pot temperature) ranges between 23° and 45° C. Next, the contents are heated to reflux (pot temperature of about 70° C.) and held at reflux for 3 hours after which heating is discontinued and the contents of the vessel allowed to cool to ambient temperature. Next, 127.3 g of trimethyl-hexamethylene diisocyanate is added to the vessel now equipped for distillation. The contents are next heated to 68° C. whereupon distillation is observed to begin. Over the period of 11½ hours a total of 6,770 g of distillate is collected while the pot temperature ranges from 68° to 122° C. Heating is discontinued and the contents of the vessel are allowed to cool to ambient temperature.

The resulting product contains an ungelled partial hydrolysis product of an organosilicon-containing material prepared utilizing a controlled amount of water.

(c) This part illustrates the preparation of a coating composition of the invention. The composition is prepared by mixing the following ingredients:

| Component | Parts by Weight (g) |
| --- | --- |
| Product of part (a) above | 125.0 |
| Product of part (b) above | 38.5 |
| Ultraviolet light absorber (TINUVIN 328 from Ciba Geigy) | 2.0 |
| Ultraviolet light absorber (TINUVIN 292 from Ciba Geigy) | 0.5 |

| Component | Parts by Weight (g) |
|---|---|
| Dibutyltin dilaurate | 2.0 |
| A 1% by weight solution of a polydimethylsiloxane in solvent available as DC 200 from DOW CORNING Corp. | 1.0 |

The coating composition has a No. 4 Ford cup viscosity of 18.2 seconds and a theoretical solids content of 61.8% by weight.

(d) The coating composition of part (c) immediately above is sprayed applied to a steel substrate having thereon a cured film of a white pigmented acrylic silane addition interpolymer. The resulting coating is cured for 30 minutes at 250 degrees Farenheit (°F., 121° C.) providing a cured film of 1.5 to 2.2 mils dry film thickness. The resulting cured film has a 20 degree gloss of 82, a DOI of 75, a Sward hardness of 38 and a Tukon hardness of 8.2.

EXAMPLE 3

(a) This part illustrates the preparation of an ungelled partial hydrolysis product of an organosilicon-containing material prepared utilizing a controlled amount of water.

To a flask equipped with addition funnel, reflux condenser, thermometer, heater, stirrer and nitrogen inlet is charged at room temperature (about 24° C.) under a blanket of nitrogen, 25,855.0 g (190.0 moles) of methyltrimethoxysilane (A-163) and 261.4 g (1.182 moles) of gamma-aminopropyltriethoxysilane (A-1100). Next, the contents of the flask are slowly heated over a period of 30 minutes to 50° C. at which point the slow addition of deionized water to the contents of the flask is begun. While the contents of the flask are stirred, a total of 1883.0 g (104.6 moles) of deionized water is added to the contents of the flask over a period of 75 minutes while the temperature of the contents of the flask (pot temperature) is maintained in the range of from 50° to 58° C. Immediately after the addition of the water is completed, the contents of the flask are heated to reflux over a period of 17 minutes at the end of which period the pot temperature is 67° C. The contents of the flask are allowed to reflux over a period of about 3 hours and 8 minutes while the pot temperature is maintained in the range of from 64 to 68° C. after which period heating is discontinued and the contents of the flask allowed to cool to ambient temperature. The resulting composition contains an ungelled partial hydrolysis product of an organosilicon-containing material prepared utilizing a controlled amount of water.

(b) This part illustrates the preparation of an ungelled acrylic polymer containing hydrolyzable silyl groups by reacting an acrylic polyol with the product of part (a) immediately above.

A reaction vessel equipped with condenser, stirrer, thermometer, distillation column, and means for maintaining a nitrogen blanket is charged at ambient temperature with 4131.0 g of a hydroxyl-functional acrylic polymer[1] and 5941.0 g of the partially hydrolyzed organosilane composition of part (a) immediately above. The contents of the vessel are slowly heated to reflux during a period of 1 hour and 9 minutes at the end of which period the pot temperature is observed to be 69° C., the head temperature is observed to be 51° C., and about 100 milliliters (ml) of distillate has been collected. Heating is continued for a period of 2 hours and 8 minutes while the temperature of the contents of the vessel (pot temperature) ranges between 69° and 75° C. (head temperature between 51° and 65° C.) until a total of about 1600 ml of distillate (1389.5 g) has been collected at which point heating is discontinued and the contents of the vessel allowed to cool overnight to ambient temperature. Thereafter, the contents of the vessel (still equipped as above) are heated over a period of 12 minutes to a pot temperature of 73° C. (head temperature, 57° C.) at which temperature distillate (containing methanol) is observed to be distilling off. Heating is continued over a period of 2 hours and 41 minutes while the contents of the vessel are refluxed and maintained in a temperature range of from 75° to 110° C. (head temperature of from 57° to 80° C.) at the end of which period heating is discontinued and the contents of the vessel allowed to cool to ambient temperature. The total weight of distillate collected is observed to be 2,467 g; and the total weight of the resulting product in the reaction vessel is observed to be 7,562 g. The resulting product composition contains an acrylic polymer containing hydrolyzable silyl groups and has a viscosity of 1.8 stokes and a color value of 2. The percent by weight total solids content of a sample of the product measured at 150° C. for 2 hours is 46.5%. The percent by weight total solids content of a sample of the product measured at 110° C. for 1 hour is 50.2%.

[1]An acrylic polyol resin (30.0% by weight methyl methacrylate, 25.0% by weight styrene, 19.0% by weight butyl methacrylate, 12.0% by weight 2-ethylhexyl acrylate and 14.0% by weight hydroxyethyl acrylate) at from 58 to 60% by weight resin solids in a mixture of solvents (74.7% by weight butyl acetate, 15.1% by weight naphtha, and 10.2% by weight toluene) and having a Gardner-Holdt bubble tube viscosity of about X—Z+.

(c) This part illustrates the preparation of the ungelled acrylic polymer containing hydrolyzable silyl groups which is further modified with an adduct of the diglycidyl ether of hydrogenated bisphenol-A and gamma-aminopropyltriethoxysilane.

A reaction vessel equipped with condenser, stirrer, thermometer, dropping funnel, and means for maintaining a nitrogen blanket is charged at ambient temperature with 1090 g of the product composition of part (b) immediately above, and 70.4 g of gamma-aminopropyltriethoxysilane. The contents of the vessel are heated over a period of 20 minutes to 60° C. at which point the addition of 70.4 g of the diglycidyl ether of hydrogenated bisphenol-A (obtained as DRH-1510 from Shell Chemical Company) is begun. Addition of the DRH-1510 to the contents of the vessel with stirring is continued over a period of 45 minutes while the temperature of the contents of the vessel is maintained in a range of 60° to 62° C. at the end of which period the addition has been completed. Thereafter, the contents of the vessel are held for 30 minutes at 62° C. after which the temperature is raised over a period of 30 minutes to 100° C. and held at 100° C. for 1 hour after which heating is discontinued and the contents of the vessel cooled to ambient temperature. To 805,8 g of the resulting product is added 13 g of methanol. The resulting composition has a viscosity of 1.7 stokes, a color value of 3–4, an epoxy equivalent weight of infinity, and a weight per unit volume of 8.63 pounds per gallon. The percent by weight total solids content of a sample of the product measured at 150° C. for 2 hours is 49.3%. The percent by weight total solids content of a sample of the product measured at 110° C. for 1 hours is 54.7%.

(d) This part illustrates the preparation of an ungelled partial hydrolysis product of an organosilicon-containing material prepared utilizing a controlled amount of water.

To a flask equipped with addition funnel, reflux condenser, thermometer, heater, stirrer and means for maintaining a nitrogen blanket is charged at room temperature under a blanket of nitrogen 2346.2 g of methyl trimethoxy silane and 23.7 g of gamma-aminopropyl triethoxy silane. Next the contents of the flask are heated over a period of 15 minutes to a temperature of 50° C. at which point the slow addition of deionized water to the contents of the flask is begun. While the contents of the flask are stirred, a total of 171 g of deionized water is added over a period of 48 minutes. The contents of the flask are heated over 25 minutes to reflux and thereafter held are reflux for 3 hours and 5 minutes while the pot temperature ranges from 66° to 68° C. Thereafter, heating is discontinued and the contents of the flask are allowed to cool over a period of 50 minutes to 55° C. at which temperature 634.4 g of gamma-aminopropyl triethoxy silane is added to the flask. The contents of the flask are allowed to cool further to 50° C. whereupon the addition of the diglycidyl ether of hydrogenated bisphenol-A is begun. A total of 634.4 g of the diglycidyl ether of hydrogenated bisphenol-A is added to the flask over a period of 1 hour while the pot temperature ranges between 50° and 58° C. Next, the contents are heated to reflux over the next 15 minutes and held at reflux for 2½ hours while the pot temperature is maintained at 68° C. Thereafter, heating is discontinued and the contents of the flask are allowed to cool to ambient temperature overnight. Next, the contents are heated over a period of 25 minutes to 56° C. whereupon 190.4 g of gamma-glycidoxypropyl trimethoxy silane is added to the flask. Over the next 15 minutes the temperature is raised to 60° C. and thereafter held at 60° C. for 3 hours after which the contents of the flask are allowed to cool to room temperature.

The resulting product contains an ungelled partial hydrolysis product of an organosilicon-containing material prepared utilizing a controlled amount of water. The composition has a No. 2 Shell Cup viscosity of 21.3 seconds at room temperature, a Gardner color value of 1, an epoxy equivalent weight of infinity, an amine equivalent weight of 1499.2, and has a total content measured for 1 hour at 110° C. of 46.8% by weight.

(e) This part illustrates the preparation of a coating composition of the invention. The composition is prepared by mixing the following ingredients:

| Component | Parts by Weight (g) |
|---|---|
| Product of part (c) above | 56.2 |
| Product of part (d) above | 77.7 |
| Acrylic polyol resin as described in footnote 1 of part (b) of Example 3 | 16.5 |
| Dibutyltin dilaurate | 3.0 |

(f) The coating composition of part (e) immediately above is applied with a drawn down bar to a zinc phosphated, steel substrate to provide a dry film thickness of from 1.3 to 1.5 mils. The coating is allowed to cure at ambient conditions for about 16 hours to provide a glossy, sovlent and water resistant film having a pencil hardness of 2H.

EXAMPLE 4

(a) This part illustrates the preparation of a an ungelled partial hydrolysis product of a organosilicon-containing material prepared utilizing a controlled amount of water.

A reaction vessel equipped with addition funnel, reflux condenser, thermometer, dropping funnel, heater, stirrer and nitrogen inlet is charged at room temperature with 17,371 g (127.6 moles) of methyltrimethoxysilane, 11,581 g of QP8-5314 (a mixture of 25 mole percent methylphenyldimethoxysilane and 75 mole percent phenyltrimethoxysilane providing 14.9 moles of methylphenyldimethoxysilane and 44.7 moles of phenyltrimethoxysilane; available from Down Corning Corp.) and 145 g of 2-amino-2-methylpropanol. The contents of the vessel are heated for 47 minutes to a temperature of 48° C. whereupon heating is discontinued and two minutes later the addition of deionized water to the contents of the vessel is begun. While the contents of the reaction vessel are stirred, a total of 1,695 g (94.2 moles) of deionized water is added to the vessel over a perod of 1 hour and 47 minutes while the temperature of the contents of the reaction vessel ranges between 48 and 51° C. Thereafter, the contents of the vessel are allowed to remain for 31 minutes 51° C. at the end of which period the contents of the vessel are heated over a period of 22 minutes to a temperature of 62° C. at which temperature refluxing is observed. Thereafter the contents of the vessel are refluxed for 1 hour and 44 minutes while the pot temperature is maintained in a range of from 62° to 67° C. at the end of which period refluxing is discontinued and the contents of the vessel allowed to cool to ambient temperature. The resulting composition is a partially hydrolyzed mixture of organosilanes.

(b) This part illustrates the preparation of a composition of the invention prepared in situ by reaction of an acrylic polyol with an excess of the ungelled partial hydrolysis product of part (a) immediately above.

A reaction vessel equipped with condenser, stirrer, addition funnel, thermometer, distillation column, and means for maintaining a nitrogen blanket is charged at ambient temperature with 7902 g of an acrylic polyol resin (as described in footnote 1 of part (a) of Example 10) and 9877 g of the ungelled partial hydrolysis product of part (a) immediately above, and the contents of the vessel are heated to reflux (about 70° C.) and held at reflux for 2 hours. Next, the vessel is equipped for distillation. Next, the contents of the vessel are distilled for 4 hours during which the temperature ranges from 70° to 110° C. at the end of which period a total of 3818 g of distillate is collected. The resulting product contains an acrylic polymer containing hydrolyzable silyl groups and an ungelled partial hydrolysis product of a mixture of organosilanes. The product has a Gardner-Holdt bubble tube viscosity of 5.5 seconds (25° C.) and a total solids content of 56.3% by weight measured at 110° C. for 1 hour.

(c) This part illustrates the preparation of a coating composition of the invention. The composition is prepared by mixing the following ingredients:

| Component | Parts by Weight (g) |
|---|---|
| Product of part (b) above | 120.5 |
| Dibutyltin dilaurate | 1.50 |

The coating ciomposition is drawn down on a zinc phosphated, steel substrate and cured ambient temperature (relative humidity of 68%) for about 16 hours to provide a dry film having a thickness of 1.0 mils. The resulting cured film has a 20 degree gloss of 80% and a pencil hardness of HB. The film withstands 30 double rubs (back-and-forth finger rubs) with a cloth soaked in methylethyl ketone.

EXAMPLE 5

(a) This part illustrates the preparation of a an ungelled partial hydrolysis product of an organosilicon-containing material prepared utilizing a controlled amount of water.

A reaction vessel equipped with addition funnel, reflux condenser, thermometer, dropping funnel, heater, stirrer and nitrogen inlet is charged at room temperature with 9600 g of methyltrimethoxysilane, 6400 g of QP8-5314 (a mixture of 25 mole percent methylphenyldimethoxysilane and 75 mole percent phenyltrimethoxysilane providing 14.9 moles of methylphenyldimethoxysilane and 44.7 moles of phenyltrimethoxysilane; available from Dow Corning Corp.) and 80 g of 2-amino-2-methylpropanol. The contents of the vessel are heated for 21 minutes to a temperature of 50° C. whereupon the additionn of deionized water to the contents of the vessel is begun. While the contents of the reaction vessel are stirred, a total of 937 g of deionized water is added to the vessel over a period of 2 hours and 4 minutes while the temperature of the contents of the reaction vessel ranges between 50° and 58° C. Thereafter, the contents of the vessel are heated over a period of 40 minutes to a temperature of 68° C. at which temperature refluxing is observed. Thereafter, the contents of the vessel are refluxed for 2 hours and 55 minutes while the pot temperature is maintained in a range of from 67° to 68° C. at the end of which period refluxing is discontinued and the contents of the vessel allowed to cool to ambient temperature. The resulting composition contains an ungelled partial hydrolysis product of an organosilicon-containing material prepared utilizing a controlled amount of water.

(b) This part illustrates the preparation of a composition of the invention prepared in situ by reaction of an acrylic polyol with an excess of the ungelled partial hydrolysis product of part (a) immediately above.

A reaction vessel equipped with condenser, stirrer, addition funnel, thermometer, distillation column, and means for maintaining a nitrogen blanket is charged at ambient temperature with 600 g of an acrylic polyol resin (as described in footnote 1 of part (a) of Example 10) and 750 g of the ungelled partial hydrolysis product of part (a) immediately above, and the contents of the vessel are heated to reflux (about 70° C.) and held at reflux for 2 hours. Next, the vessel is equipped for distillation. Next, the contents of the vessel are distilled for 2 hours during which the temperature ranges from 68° to 100° C. at the end of which period of total of 232 g of distillate is collected. The resulting product contains an acrylic polymer containing hydrolyzable silyl groups and an ungelled partial hydrolysis product of a mixture of organosilanes. The product has a Gardner-Holdt bubble tube viscosity of 7.3 seconds (25° C.) and a total solids content of 64.7% by weight measured at 110° C. for 1 hour.

(c) This part illustrates the preparation of an adduct the diglycidylether of hydrogenated bisphenol-A with gamma-aminopropyl triethoxy silane.

To a reaction vessel equipped with addition funnel, thermometer, reflux condenser, thermometer, dropping funnel, heater, stirrer and nitrogen inlet is added 4400 g of gamma-aminopropyl triethoxy silane at ambient temperature. The contents of the vessel are heated to 50° C. at which temperature the slow addition of the diglycidylether of hydrogenated bisphenol-A (available as EPONEX 5110 from Shell Chemical Co.) is begun. A total of 4400 g of the EPONEX 5110 is added over a period of 2 hours and 45 minutes while the temperature of the reaction vessel is maintained (by intermittent cooling) in a range of from 50° to 62° C. After the addition of the EPONEX 5110 is completed, the contents of the vessel are held at temperature of from 52° to 60° C. for 3 hours and 35 minutes. To 4800 g of the resulting material is mixed 655 g of methanol to produce the resulting product having a theoretical solids content of 88% by weight.

(d) With 191 g of the product of part (b) immediately above is mixed 32 g of the product of part (c) immediately above.

(e) A coating composition of the invention is prepared by mixing the following ingredients:

| Component | Parts by Weight (g) |
| --- | --- |
| The mixture of part (d) above | 12.5 |
| Dibutyltin dilaurate | 0.15 |

The coating composition is drawn down on a zinc phosphated, steel substrate and cured ambient temperature (at 80% relative humidity) for 3 days to provide a dry film having a thickness of from 1.0 to 1.3 mils. The resulting cured film has a 20 degree gloss of 73%, a pencil hardness of F and its resistant to scratching by fingernail. The film withstands 100 double rubs (back-and-forth finger rubs) with a cloth soaked in methylethyl ketone.

EXAMPLE 6

(a) A coating composition of the invention is prepared by mixing the following components:

| Component | Parts by Weight (g) |
| --- | --- |
| The mixture of part (d) of Example 5 above | 8.75 |
| Silane addition interpolymer of part (a) of Example 1 above | 5.0 |
| Dibutyltin dilaurate | 0.25 |

The coating composition is drawn down on a zinc phosphated, steel substrate and cured ambient temperature (at 80% relative humidity) for 16 hours to provide a dry film having a thickness of from 1.0 to 1.3 mils. The resulting cured film has a 20 degree gloss of 70%. The film is resistant to scratching by fingernail and withstands 51 double rubs (back-and-forth finger rubs) with a cloth soaked in methylethyl ketone.

EXAMPLE 7

(a) This part illustrates the preparation of a composition of the invention prepared in situ by reaction of an acrylic polyol with an excess of the ungelled partial hydrolysis product of part (a) of Example 5 above.

A reaction vessel equipped with condenser, stirrer, addition funnel, thermometer, distillation column, and means for maintaining a nitrogen blanket is charged at ambient temperature with 300 g of an acrylic polyol resin[1] and 654 g of the ungelled partial hydrolysis product of part (a) of Example 5 above and the contents of the vessel are heated to reflux (about 70° C.) and held at reflux for 1 hour and 30 minutes. Next, the vessel is equipped for distillation. Next, the contents are heated to 68° C. at which temperature distillation is observed to begin. Distillation is continued for 1 hour and 32 minutes after which period 44 ml of n-butanol is added to the contents of the vessel. Therafter, distillation is continued for an additional 37 minutes. During the entire distillation the temperature ranges from 68° to 139° C. A total of 323 ml of distillate is collected. The resulting product contains an acrylic polymer containing hydrolyzable silyl groups and an ungelled partial hydrolysis product of a mixture of organosilanes.

[1] An acrylic polyol resin (40.0% by weight hydroxypropyl acrylate, 20.0% by weight styrene, 19.0% butyl acrylate, 18.5% butyl methacrylate, 2.00% acrylic acid and 0.50% methyl methacrylate) at about 70% by weight resin solids in a mixture of solvents (45.0% by weight xylene, 45.0% by weight aromatic naphtha available as SOLVESSO 100 and 10% by weight isobutanol) and having a Gardner-Holdt bubble tube viscosity of about Z4 and an acid value of about 11.6.

(b) A coating composition of the invention is prepared by mixing the following components:

| Component | Parts by Weight (g) |
| --- | --- |
| The product of part (a) above | 13.4 |
| The mixture of part (c) of Example 5 above | 1.59 |
| Dibutyltin dilaurate | 0.15 |

The coating composition is drawn down on a zinc phosphated, steel substrate primed with a smooth urethane-epoxy primer and cured for 30 minutes at 250° F. (121° C.) to provide a dry film having a thickness of from 1.0 to 1.3 mils. The resulting cured film has a 20 degree gloss of 85%, a DOI of 100 and withstands greater than 100 double rubs with a cloth soaked in methylethyl ketone.

EXAMPLE 8

(a) This part illustrates the preparation of a composition of the invention prepared in situ by reaction of an acrylic polyol with an excess of the ungelled partial hydrolysis product of part (a) of Example 5 above.

A reaction vessel equipped with condenser, stirrer, addition funnel, thermometer, distillation column, and means for maintaining a nitrogen blanket is charged at ambient temperature with 150 g of an acrylic polyol resin[1] and 344.8 g of the ungelled partial hydrolysis product of part (a) of Example 5 above and the contents of the vessel are heated to reflux (65° C.) and held are reflux for 1 hour and 30 minutes while the pot temperature ranges between 65° and 70° C. Next, the vessel is equipped for distillation. Next, the contents are heated to 69° C. at which temperature distillation is observed to begin. Distillation is continued for 33 minutes while the temperature ranges from 69° to 100° C. until a total of 99.1 g of distillate is collected. The resulting product contains an acrylic polymer containing hydrolyzable silyl groups and an ungelled partial hydrolysis product of a mixture of organosilanes. The product has a total solids content of 55.78% by weight determined at 110° C. for 1 hour.

[1] An acrylic polyol resin (40.0% by weight hydroxypropyl acrylate, 19.0% butyl acrylate, 18.5% butyl methacrylate, 20.0% by weight isobornyl methacrylate, 2.00% acrylic acid and 0.50% methyl methacrylate) at about 70% by weight resin solids in a mixture of solvents (100% aromatic naphtha available as SOLVESSO 100) and having a viscosity of 16.5 Stokes, an acid value of 11.6, and a peak molecular weight of 3059 determined by gel permeation chromatography using a polystyrene standard.

(b) A coating composition of the invention is prepared by mixing the following components:

| Component | Parts by Weight (g) |
| --- | --- |
| The product of part (a) above | 16.7 |
| The mixture of part (c) of Example 5 above | 0.8 |
| Dibutyltin dilaurate | 0.15 |

The coating composition is drawn down on a zinc phosphated, steel substrate primed with a smooth urethane-epoxy primer and cured for 30 minutes at 250° F. (121° C.) to provide a dry film having a thickness of from 1.0 to 1.3 mils. The resulting cured film has a 20 degree gloss of 81%, a DOI of 100, a pencil hardness of B, and withstands greater than 100 double rubs with a cloth soaked in methylethyl ketone.

EXAMPLE 9

(A) A coating composition of the invention is prepared by mixing the following components:

| Component | Parts by Weight (g) |
| --- | --- |
| The product of part (a) of Example 1 above | 12.5 |
| The product of part (b) of Example 1 above | 8.52 |
| Acrylic polyol[1] | 16.67 |
| Dibutyltin dilaurate | 0.63 |
| Toluene | 2.0 |

[1] An acrylic polyol resin (prepared from 30.0% by weight methyl methacrylate, 25.0% by weight styrene, 19.0% by weight butyl methacrylate, 12.0% by weight 2-ethylhexyl acrylate and 14.0% by weight hydroxyethyl acrylate) at from 58 to 60% by weight resin solids in a mixture of solvents (74.7% by weight butyl acetate, 15.1% by weight naphtha and 10.2% by weight toluene) and having a Gardner-Holdt bubble tube viscosity of about X-Z+.

The coating composition is drawn down on a zinc phosphated, steel substrate and cured for 30 minutes at 210° F. (98.9° C.) to provide a dry film having a thickness of from 1.0 to 1.3 mils. The resulting cured film is glossy, hard and withstands greater than 100 double rubs with a cloth soaked in methylethyl ketone.

EXAMPLE 10

Part (a) of this example illustrate the preparation of an acrylic addition interpolymer containing hydrolyzable silyl groups involving reaction of a hydroxyl-functional acrylic resin with an organosilicon-containing material. Part (b), illustrates the preparation of an ungelled partial hydrolysis product prepared utilizing a controlled amount of water. Part (c) illustrates the preparation of a pigment paste and part (d) illustrates the preparation of a coating composition of the invention.

(a) A reaction vessel equipped with condenser, stirrer, addittion funnel, thermometer, distillation column, and means for maintaining a nitrogen blanket is charged at ambient temperature with 1,985 g of methyltrimethoxysilane (A-163), and 20.1 g of gamma-aminopropyltriethoxysilane (A-1100), and the contents of the vessel are heated over a period of 16 minutes to 57° C. at which temperature the controlled addition of water to the contents of the vessel is begun and heating is discontinued. While the contents of the vessel are stirred, a total of 144.5 g (8.03 moles) of deionized water is added slowly to the vessel over a period 72 minutes while the temperature of the contents of the vessel (pot temperature) ranges between 52° and 53° C. Within 6 minutes after the addition of the water is completed, the controlled addition of a further amount of gamma-aminopropyltriethoxysilane is begun. With stirring a total of 178.9 g of gamma-aminopropyltriethoxysilane is added slowly to the vessel over a period of 28 minutes while the pot temperature ranges between 53° and 58° C. Within 4 minutes after the addition of the gamma-aminopropyltriethoxysilane is completed, the addition of the diglycidyl ether of hydrogenated Bisphenol-A (EPONEX 1510) is begun. With stirring a total of 178.9 g of the EPONEX 1510 is slowly added to the contents of the vessel over a period of 52 minutes. After the addition of the EPONEX 1510 is completed, the contents are held at 60° to 64° C. for 1 hour. Next, the contents of the vessel are heated to reflux over a period of 7 minutes and held at 69° to 71° C. for 1 hour. Thereafter, the contents of the vessel are cooled to between 50° and 60° C. whereupon 1494.5 g of a hydroxyl-functional acrylic polymer[1] (containing about 1.09 equivalents of OH) is added to the vessel. Heating is resumed and the contents of the vessel are distilled over a period of 3 hours and 39 minutes while the pot temperature ranges between 73° and 92° C. (head temperature between 50° and 69° C.) until a total of about 800 ml of distillate has been collected at which point heating is discontinued and the contents of the vessel are cooled to a temperature of 60° C. Next, 49 g of methanol are added to the reaction vessel and the contents of the vessel are cooled to ambient temperature.

[1] An acrylic polyol resin (prepared from 30.0% by weight methyl methacrylate, 25.0% by weight styrene, 19.0% by weight butyl methacrylate, 12.0% by weight 2-ethylhexyl acrylate and 14.0% by weight hydroxyethyl acrylate) at from 58 to 60% by weight resin solids in a mixture of solvents (74.7% by weight butyl acetate, 15.1% by weight naphtha and 10.2% by weight toluene) and having a Gardner-Holdt bubble tube viscosity of about X-Z+.

The resulting product contains an ungelled acrylic addition interpolymer having hydrolyzable silyl groups. The product has a viscosity of 2.0 stokes, an epoxy equivalent weight of infinity, a color value of less than 1, and a percent by weight total solids content (measured at 150° C. for 2 hours) of 38.2%.

(b)(i) A reaction vessel equipped with condenser, stirrer, addition funnel, thermometer, distillation column and a nitrogen inlet is charged at ambient temperature with 15,570 g of methyltrimethoxysilane and 157.4 g of gamma-aminopropyltriethoxysilane. The contents of the vessel are heated over a period of 25 minutes to 50° C. at which time heating is discontinued. Next, 1,133.8 g of deionized water are added to the vessel over about 2 hours while the contents of the vessel are stirred and the temperature of the contents of the vessel ranges from 50° C. to 60° C. Within 26 minutes of the addition of the last amount of deionized water, the contents are heated to reflux over a period of 41 minutes and held at a temperature of between 68° and 69° C. for three hours. Thereafter, heating is discontinued and the contents of the vessel are allowed to cool overnight to ambient temperature under a nitrogen blanket. Next, 127.3 g of trimethylhexamethylene diisocyanate are added to the vessel which has been modified by replacement of the addition funnel with a claisen head. Thereafter, the contents of the vessel are heated over a period of about 1 hour, at the end of which period, the pot temperature is 66° C. (head temperature, 64° C.) and 150 ml of distillate has been collected. Heating is continued for 4 hours and 25 minutes while the pot temperature ranges between 66° and 72° C. and the head temperature ranges between 64° and 67° C. until a total of 4,000 ml (3609 g) of distillate has been collected. Heating is continued for 2 hours and 18 minutes while the pot temperature ranges between 74° and 86° C. (head temperature between 67° and 72° C.) until an additional 2,000 ml (1817.5 g) of distillate has been collected. Heating is continued for 2 hours while the pot temperature ranges between 86° and 130° C. (head temperature between 72° and 108° C.) until an additional 1,200 ml (1,364 g) of distillate has been collected whereupon heating is discontinued and the contents of the vessel allowed to cool to ambient temperature. The total weight of the resulting product is 10,110 g.

(b)(ii) The product of part (b)(i), immediately above, at a level of 5,587.5 g, 1,200 g of methanol and 1,395 g of gamma-aminopropyltriethoxysilane are charged to a reaction vessel. Next, the contents of the vessel are heated to a temperature of 50° C. over a period of about ½ hour. Thereafter, 1,295 g of the diglycidyl ether of hydrogenated Bisphenol-A (EPONEX 1510) is added to the vessel over about 2 hours while the temperature is held at between 50° and 60° C. Next, the contents of the vessel are held at about 60° C. for and additional hour. Thereafter, the contents are heated to reflux over a period of about ½ hour and held at a temperature of 74° C. for 3 hours. Thereafter, the contents of the vessel are allowed to cool to a temperature of 55° C. over 1½ hours. Next, 419 g of glycidoxypropyltrimethoxy silane (available as A-187 from Union Carbide) are added to the contents of the vessel which are then heated to a temperature of 60° C. over 24 minutes. The contents of the vessel are held at this temperature for three hours and thereafter allowed to cool to ambient temperature.

The resulting product contains an ungelled partial hydrolysis product of an organosilicon-containing material prepared utilizing a controlled amount of water.

(c) A pigment paste is formed as follows. First, 12 pbw of an amino-functional acrylate reaction product of 80% by weight methyl methacrylate and 20% by weight t-butylaminoethyl methacrylate and 8 pbw of propyleneglycol monomethylether acetate (available as DOWANOL PM acetate from Dow Chemical Co.) are added to a vessel. Next, 0.2 pbw of organosilicic clay (available as BENTONE SD-2 from NL Industries, Inc.) is stirred into the mixture using a Cowles blade. When the mixture is smooth, 4.2 pbw of magnesium silicate (available as 399 SF from Whittaker, Clark & Daniels, Inc.), 5.8 pbw of China clay (available as ASP 200 from Englehard Industries), 6.8 pbw of titanium dioxide (available as TIPURE R-60 from E. I. DuPont de Nemours & Co., Inc.) and 0.8 pbw of fumed silica (available as LO-VEL 27 from PPG Industries, Inc.) are added to the mixture and ground, using zircoa beads, to a Hegman grind of seven. Next, 5 pbw of propyleneglycol monomethylether acetate, 11.7 pbw of xylene and 4 pbw of the amino-functional acrylate reaction product above are dispersed in the mixture. The resulting composition is a pigment paste.

(d) A coating composition, suitable for use between an already hardened coating on a metal substrate and a topcoating composition, is prepared by mixing the following ingredients:

| Component | Parts by Weight (g) |
| --- | --- |
| Pigment paste of Part (c) | 49.2 |
| Amino-functional acrylate[1] | 8.3 |
| Product of Part (a) | 37.3 |
| Product of Part (b) | 54.9 |
| Paratoluene sulfonic acid (40% by | 2.1 |

| Component | Parts by Weight (g) |
|---|---|
| weight in isopropanol) | |
| Dibutyltin diacetate solution (50% by weight in methylethyl ketone) | 1.7 |
| Solvent blend[2] | 179.8 |

[1]Reaction product of 80% by weight methyl methacrylate and 20% by weight t-butylaminoethyl methacrylate having a peak molecular weight of 50,000.
[2]A mixture on a percent by volume basis of 29.0% methylethylketone, 34.0% lactol spirits, 16.0% propyleneglycol monomethylether acetate, 5.0% oxohexyl acetate and 16.0% ethyl acetate.

(e) The coating composition of part (d) immediately above was spray applied to a dry film thickness of 2.7 mils over a metal substrate having thereon an epoxy primer, a dry acrylic lacquer, and a cured acrylic-urethane enamel and allowed to cure at ambient temperature for 1 hour after which a coating of the acrylic lacquer is applied to the film of the composition of the invention. The cured film of the invention showed good adhesion to the acrylic-urethane undercoat as well as to the acrylic lacquer overcoat.

What is claimed is:

1. A moisture-curable composition comprising:

(A) an ungelled partial hydrolysis product of an organosilicon-containing material, said organosilicon-containing material comprising greater than or equal to 10 mole percent of at least one organosilane compound corresponding to the formula $R-Si-Y_3$ in which R represents hydrogen, or a $C_1-C_{10}$ group joined to Si through an Si—C linkage, and each Y independently represents an easily hydrolyzable group, wherein said partial hydrolysis product is prepared by hydrolyzing said easily hydrolyzable groups of said organosilane compound with water wherein the amount of water is determined according to the following formula $$(E_{1,2} \times 0.5) + (E_{3,4} \times Z) = W,$$

wherein

W represents the total moles H$_2$O employed calculated on total equivalents of said easily hydrolyzable groups given that one equivalent of said easily hydrolyzable groups corresponds to 1 mole of said easily hydrolyzable groups employed, $E_{1,2}$ represents the total number of equivalents of Y employed from organosilane compounds containing one or two Y groups, $E_{3,4}$ represents the total number of equivalents of Y employed from organosilane compounds containing three or four Y groups, and Z is a number in the range of from 0.023 to 0.43; provided that said organosilicon-containing material has an average functionality of equal to or greater than 2.4 based on easily hydrolyzable Y groups attached to silicon atoms of organosilane compounds containing easily hydrolyzable Y groups present in said organosilicon-containing material but excluding easily hydrolyzable Y groups attached to silicon atoms of organosilane compounds having only 1 easily hydrolyzable Y group which may be present in said organosilicon-containing material; and (B) an acrylic addition interpolymer containing at least one silicon atom directly bonded to a hydrolyzable group.

2. The composition of claim 1 wherein each Y represents $-OR^1$ wherein $R^1$ is a $C_1-C_3$ alkyl group.

3. The composition of claim 1 wherein said ungelled partial hydrolysis product contains an amount of said easily hydrolyzable Y groups such that the ratio of the number of grams of said partial hydrolysis product to equivalents of said easily hydrolyzable Y groups in said partial hydrolysis product is in a range of from 40 to 300.

4. The composition of claim 1 wherein said organosilicon-containing material contains greater than or equal to 30 mole percent of said organosilane compound corresponding to the formula $R-Si-Y_3$.

5. The composition of claim 1 from which at least a portion of volatile components has been removed from said ungelled partial hydrolysis product, prior to combination with said acrylic addition interpolymer, by distillation of said partial hydrolysis product at a temperature of less than or equal to 160 degrees Celsius.

6. The composition of claim 1 wherein said ungelled partial hydrolysis product comprises at least 10 percent by weight of a compound corresponding to the formula

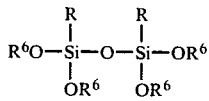

wherein

R independently represents a $C_1-C_{10}$ group joined to Si through an Si—C linkage, or hydrogen, and $R^6$ independently represents a $C_1-C_3$ alkyl group.

7. The composition of claim 1 wherein said ungelled partial hydrolysis product of claim 1 comprises (1) at least 10 percent by weight of a compound corresponding to the formula $R-Si(OR^6)_3$ wherein R independently represents a $C_1-C_{10}$ group joined to Si through an Si—C linkage, or hydrogen, and $R^6$ independently represents a $C_1-C_3$ alkyl group, and (2) at least 10 percent by weight of a compound corresponding to the formula

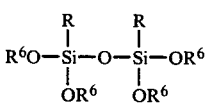

wherein

R independently represents a $C_1-C_{10}$ group joined to Si through an Si—C linkage, or hydrogen, and $R^6$ independently represents a $C_1-C_3$ alkyl group.

8. The composition of claim 1 wherein said ungelled partial hydrolysis product of claim 1 comprises (1) at least 10 percent by weight of a compound corresponding to the formula $R-Si(OR^6)_3$ wherein R independently represents a $C_1-C_{10}$ group joined to Si through an Si—C linkage, or hydrogen, and $R^6$ independently represents a $C_1-C_3$ alkyl group, (2) at least 10 percent by weight of a compound corresponding to the formula

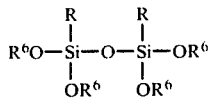

wherein
R independently represents a $C_1$-$C_{10}$ group joined to Si through an Si—C linkage, or hydrogen, and
$R^6$ independently represents a $C_1$-$C_3$ alkyl group, and (3) at least 10 percent by weight of a compound corresponding to the formula

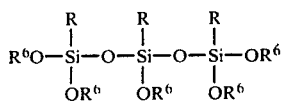

wherein
R independently represents a $C_1$-$C_{10}$ group joined to Si through an Si—C linkage, or hydrogen, and
$R^6$ independently represents a $C_1$-$C_3$ alkyl group.

9. The composition of claim 1 wherein said ungelled partial hydrolysis product of claim 1 comprises
(1) at least 10 percent by weight of a compound corresponding to the formula

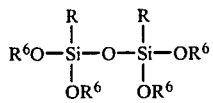

wherein
R independently represents a $C_1$-$C_{10}$ group joined to Si through an Si—C linkage, or hydrogen, and
$R^6$ independently represents a $C_1$-$C_3$ alkyl group, and (2) at least 10 percent by weight of a compound corresponding to the formula

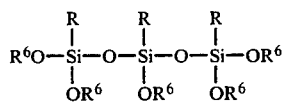

wherein
R independently represents a $C_1$-$C_{10}$ group joined to Si through an Si—C linkage, or hydrogen, and
$R^6$ independently represents a $C_1$-$C_3$ alkyl group.

10. The composition of claim 1 wherein said acrylic addition interpolymer contains alkoxy silane groups and/or acyloxy silane groups, said addition interpolymer derived from the reaction of a mixture of monomers wherein the mixture of monomers contains:
(i) one or more ethylenically unsaturated silicon-free monomers, and
(ii) a copolymerizable ethylenically unsaturated silane monomer selected from the group consisting of an alkoxy silane monomer, an acyloxy silane monomer, and a mixture thereof.

11. The composition of claim 10 wherein for said acrylic addition interpolymer the amount of said ethylenically unsaturated silicon-free monomers ranges from about 50 percent to about 95 percent by weight based on the total weight of said mixture of monomers, and the amount of said copolymerizable ethylenically unsaturated silane monomer ranges from about 5 to about 50 percent by weight based on the total weight of said mixture of monomers.

12. The composition of claim 11 wherein said ethylenically unsaturated silicon-free monomers (i) comprise an alkyl acrylate, alkyl methacrylate, vinyl aromatic hydrocarbon or a mixture thereof.

13. The composition of claim 11 wherein said silane monomer comprises a (meth)acrylatoalkoxysilane monomer having from 1 to 4 carbon atoms in the alkoxy group.

14. The composition of claim 10 wherein said acrylic addition interpolymer has a peak molecular weight as determined by gel permeation chromatography ranging from about 2,000 to about 20,000.

15. The composition of claim 10 additionally comprising an effective amount of a cure promoting catalyst.

16. The composition of claim 1 wherein said acrylic addition interpolymer has in a molecule thereof at least one group selected from:

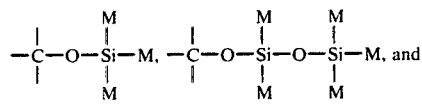

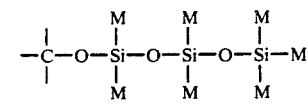

wherein each M independently is selected from the group of moieties consisting of Y, hydrogen, a $C_1$-$C_{10}$ group joined to Si through an Si—C linkage, and $OR^7$ in which $R^7$ represents alkyl having at least 4 carbon atoms, aryl, alkylaryl, arylalkyl, aryloxyalkyl, or alkyloxyalkyl, wherein Y represents an easily hydrolyzable group.

17. The composition of claim 16 wherein at least one M is a methoxy group and at least one M is methyl.

18. The composition claim 16 wherein said acrylic addition interpolymer is a reaction product of an acrylic polyol and an organosilicon-containing material comprising at least 10 percent by weight of said organosilicon-containing material of a compound corresponding to the formula $M—Si(OR^6)_3$ wherein
M independently represents $OR^6$, hydrogen, a $C_1$-$C_{10}$ group joined to Si through an Si—C linkage, or a $OR^7$ group in which $R^7$ represents alkyl having at least 4 carbon atoms, aryl, alkylaryl, arylalkyl, aryloxyalkyl, or alkyloxyalkyl, and
$R^6$ independently represents a $C_1$-$C_3$ alkyl group.

19. The composition of claim 16 wherein said acrylic addition interpolymer of is a reaction product of an acrylic polyol and an organosilicon-containing material comprising at least 10 percent by weight of said organosilicon-containing material of a compound corresponding to the formula

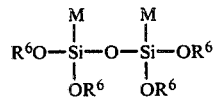

wherein
M independently represents $OR^6$, hydrogen, a $C_1$-$C_{10}$ group joined to Si through an Si—C linkage, or a $OR^7$ group in which $R^7$ represents alkyl having at least 4 carbon atoms, aryl, alkylaryl, arylalkyl, aryloxyalkyl, or alkyloxyalkyl, and $R^6$ independently represents a $C_1$-$C_3$ alkyl group.

20. The composition of claim 16 wherein said acrylic addition interpolymer is a reaction product of an acrylic polyol and an organosilicon-containing material comprising at least 10 percent by weight of said organosilicon-containing material of a compound corresponding to the formula

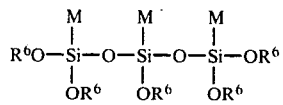

wherein

M independently represents $OR^6$, hydrogen, a $C_1$-$C_{10}$ group joined to Si through an Si—C linkage, or a $OR^7$ group in which $R^7$ represents alkyl having at least 4 carbon atoms, aryl, alkylaryl, arylalkyl, aryloxyalkyl, or alkyloxyalkyl, and $R^6$ independently represents a $C_1$-$C_3$ alkyl group.

21. The composition of claim 16 wherein said acrylic addition interpolymer is a reaction product of an acrylic polyol and an organosilicon-containing material comprising a mixture containing at least 10 percent by weight of said organosilicon-containing material of a compound corresponding to the formula $M—Si(OR^6)_3$ and at least 10 percent by weight of said organosilicon-containing material of a compound corresponding to the formula

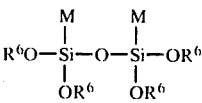

wherein

M independently represents $OR^6$, hydrogen, a $C_1$-$C_{10}$ group joined to Si through an Si—C linkage, or a $OR^7$ group in which $R^7$ represents alkyl having at least 4 carbon atoms, aryl, alkylaryl, arylalkyl, aryloxyalkyl, or alkyloxyalkyl, and $R^6$ independently represents a $C_1$-$C_3$ alkyl group.

22. The composition of claim 16 wherein said acrylic addition interpolymer is a reaction product of an acrylic polyol and a partial hydrolysis product of a compound corresponding to the formula $M—Si(OR^6)_3$ wherein M independently represents $OR^6$, hydrogen, a $C_1$-$C_{10}$ group joined to Si through an Si—C linkage, or a $OR^7$ group in which $R^7$ represents alkyl having at least 4 carbon atoms, aryl, alkylaryl, arylalkyl, aryloxyalkyl, or alkyloxyalkyl, and $R^6$ independently represents a $C_1$-$C_3$ alkyl group.

23. The composition of claim 22 wherein at least one $OR^6$ is a methoxy group and at least one M is methyl.

24. The composition of claim 22 wherein said acrylic polyol has a weight average molecular weight determined by gel permeation chromatography using a polystyrene standard of from 600 to 50,000.

25. The composition of claim 22 wherein said acrylic polyol has a hydroxyl equivalent weight of from 116 to 1,000.

26. The composition of claim 22 additionally comprising an effective amount of a cure promoting catalyst.

* * * * *

UNITED STATES PATENT AND TRADEMARK OFFICE
CERTIFICATE OF CORRECTION

PATENT NO. : 4,684,697

DATED : August 4, 1987

INVENTOR(S) : Wen-Hsuan Chang

It is certified that error appears in the above-identified patent and that said Letters Patent is hereby corrected as shown below:

Claim 18 (column 40, line 41), after "composition" insert --of--.

Claim 19 (column 40, line 54), after "interpolymer" delete "of".

Signed and Sealed this

Ninth Day of February, 1988

Attest:

DONALD J. QUIGG

Attesting Officer

Commissioner of Patents and Trademarks